(12) United States Patent
Xia et al.

(10) Patent No.: US 10,356,809 B2
(45) Date of Patent: Jul. 16, 2019

(54) METHOD FOR TRANSMISSION BY USING SCHEDULING SIGNALING, AND APPARATUS

(71) Applicant: Huawei Technologies Co., Ltd., Shenzhen, Guangdong (CN)

(72) Inventors: Liang Xia, Shenzhen (CN); Yuan Xia, Beijing (CN); Bo Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 15/148,997

(22) Filed: May 6, 2016

(65) Prior Publication Data

US 2016/0255650 A1 Sep. 1, 2016

Related U.S. Application Data

(63) Continuation of application No. PCT/CN2013/086802, filed on Nov. 8, 2013.

(51) Int. Cl.
*H04W 72/12* (2009.01)
*H04L 1/18* (2006.01)
(Continued)

(52) U.S. Cl.
CPC ....... *H04W 72/1289* (2013.01); *H04L 1/1822* (2013.01); *H04L 1/1864* (2013.01);
(Continued)

(58) Field of Classification Search
CPC ......... H04W 72/1289; H04W 72/0446; H04W 88/02; H04L 1/1822; H04L 1/1864; H04L 1/1896
See application file for complete search history.

(56) References Cited

U.S. PATENT DOCUMENTS

| 2012/0176957 A1 | 7/2012 | Chen et al. |
| 2013/0016686 A1 | 1/2013 | Li et al. |

(Continued)

FOREIGN PATENT DOCUMENTS

| CN | 101677448 A | 3/2010 |
| CN | 102137504 A | 7/2011 |

(Continued)

OTHER PUBLICATIONS

"PDCCH Content and Formats", Texas Instruments, 3GPP TSG RAN WG1 52, Feb. 11-15, 2008, 4 pages, R1-080703.

*Primary Examiner* — Derrick W Ferris
*Assistant Examiner* — Kevin H Lee

(57) ABSTRACT

Embodiments of the present invention relate to the field of communications technologies, and provide a method for transmission by using scheduling signaling, and an apparatus, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. The method specifically includes: receiving, by user equipment UE, scheduling signaling sent by a base station, where the scheduling signaling includes a HARQ process number field; acquiring a subframe number of a subframe scheduled by using the scheduling signaling; determining a transport block according to the HARQ process number field and the subframe number; and processing data in the transport block. The present invention is applied to scheduling signaling transmission.

20 Claims, 20 Drawing Sheets

(51) Int. Cl.
  *H04W 72/04*     (2009.01)
  *H04W 88/02*     (2009.01)
(52) U.S. Cl.
  CPC ....... *H04L 1/1896* (2013.01); *H04W 72/0446*
          (2013.01); *H04W 88/02* (2013.01)

(56)          References Cited

U.S. PATENT DOCUMENTS

2014/0269582 A1    9/2014  Guan
  2014/0301299 A1*  10/2014  Wu ........................ H04L 5/0091
                                                    370/329
  2014/0307567 A1*  10/2014  Li ......................... H04L 1/1812
                                                    370/252
  2015/0003425 A1*   1/2015  Kim .................... H04W 72/042
                                                    370/336
  2015/0264708 A1*   9/2015  Li ........................ H04W 28/06
                                                    370/329

FOREIGN PATENT DOCUMENTS

CN         102202408  A    9/2011
  CN         102404095  A    4/2012
  CN         102447547  A    5/2012
  CN         103139923  A    6/2013

* cited by examiner

METHOD FOR TRANSMISSION BY USING SCHEDULING SIGNALING, AND APPARATUS

CROSS REFERENCE TO RELATED APPLICATIONS

This application is a continuation of International Application No. PCT/CN2013/086802, filed on Nov. 8, 2013, which is hereby incorporated by reference in its entirety.

TECHNICAL FIELD

The present invention relates to the field of communications technologies, and in particular, to a method for transmission by using scheduling signaling, and an apparatus.

BACKGROUND

In a Long Term Evolution (LTE) system, a minimum time interval at which a base station uses one piece of scheduling signaling to schedule user equipment is one subframe, and scheduling information of only one subframe can be scheduled by using one piece of scheduling signaling. In a subsequent LTE system of an evolved release, scheduling information of multiple subframes can be scheduled by using one piece of scheduling signaling. In a scheduling signaling transfer process, UE feeds back, for new transmission scheduling, a hybrid automatic repeat request (HARQ) receiving status that corresponds to the new transmission scheduling. That is, when receiving is correct, the UE feeds back an acknowledgement (ACK) character, and when receiving is incorrect, the UE feeds back a negative acknowledgement (NACK) character. A base station sequentially determines an idle HARQ process according to a HARQ process number (HPN) and the HARQ receiving status fed back by the user equipment, generates an HPN according to the HARQ process, and then adds the HPN to scheduling signaling and sends the scheduling signaling to the user equipment. After receiving the scheduling signaling, the UE sequentially determines an idle HARQ process of the user equipment according to the HPN in the scheduling signaling, and correspondingly receives channel data scheduled by using the scheduling signaling. In a process of implementing transmission of the multi-subframe scheduling signaling, when scheduling information is incorrectly transmitted, if the base station uses single-subframe scheduling signaling to transmit retransmission scheduling information, as a result, a subframe scheduled by using single-subframe scheduling signaling may overlap with a subframe scheduled by using the multi-subframe scheduling signaling, thereby resulting in misunderstanding by the user equipment. In addition, when the user equipment misses detection of a retransmission scheduling subframe, the user equipment receives a current subframe according to the multi-subframe scheduling signaling, thereby resulting in incorrect transmission of data to be newly transmitted.

To avoid misunderstanding by user equipment and incorrect transmission of data to be newly transmitted, a solution in the prior art is: determining multiple HARQ processes according to a correspondence between process numbers of multiple HARQ processes and HARQ process fields, and generating scheduling signaling according to the correspondence between the process numbers of the multiple HARQ processes and the HARQ process fields, and according to the multiple HARQ processes. However, each subframe needs to have a process number, a maximum of eight HARQ processes can be supported by single-subframe scheduling signaling in a current frequency division duplex (FDD) system, and a maximum of 16 HARQ processes can be supported by single-subframe scheduling signaling in a current time division duplex (TDD) system. Therefore, a quantity of HARQ processes that can be supported is limited, and there is a problem of insufficient processes.

SUMMARY

Embodiments of the present invention provide a method for transmission by using scheduling signaling, and an apparatus, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads.

To achieve the foregoing objective, the following technical solutions are used in the embodiments of the present invention.

According to a first aspect, a method for transmission by using scheduling signaling is provided, including:

receiving, by user equipment UE, scheduling signaling sent by a base station, where the scheduling signaling includes a HARQ process number field;

acquiring a subframe number of a subframe scheduled by using the scheduling signaling;

determining a transport block according to the HARQ process number field and the subframe number; and processing data in the transport block.

In a first possible implementation manner, with reference to the first aspect, the scheduling signaling is single-subframe scheduling signaling, the HARQ process number field is a first HARQ process number field, and the determining a transport block according to the HARQ process number field and the subframe number includes:

performing calculation to obtain a first HARQ process according to the first HARQ process number field in the single-subframe scheduling signaling and the subframe number of the subframe scheduled by using the single-subframe scheduling signaling; and determining a first transport block in the first HARQ process according to a preset rule, or transport block configuration signaling in the single-subframe scheduling signaling, where the preset rule is a correspondence between a HARQ process and a transport block.

In a second possible implementation manner, with reference to the first aspect, the scheduling signaling is single-subframe scheduling signaling, the HARQ process number field is a first HARQ process number field, and the determining a transport block according to the HARQ process number field and the subframe number includes:

performing calculation to obtain a first HARQ process according to the first HARQ process number field in the single-subframe scheduling signaling; and performing calculation to obtain a first transport block in the first HARQ process according to the subframe number of the subframe scheduled by using the single-subframe scheduling signaling.

In a third possible implementation manner, with reference to the first aspect, the scheduling signaling is multi-subframe scheduling signaling, the HARQ process number field is a second HARQ process number field, and the determining a transport block according to the HARQ process number field and the subframe number includes:

performing calculation to obtain a second HARQ process according to the second HARQ process number field in the multi-subframe scheduling signaling and the subframe number of the subframe scheduled by using the multi-subframe scheduling signaling; and determining a second transport block in the second HARQ process according to a preset rule, or transport block configuration signaling in the multi-subframe scheduling signaling, where the preset rule is a correspondence between a HARQ process and a transport block.

In a fourth possible implementation manner, with reference to the first aspect, the scheduling signaling is multi-subframe scheduling signaling, the HARQ process number field is a second HARQ process number field, and the determining a transport block according to the HARQ process number field and the subframe number includes:

performing calculation to obtain a second HARQ process according to the second HARQ process number field in the multi-subframe scheduling signaling; and performing calculation to obtain a second transport block in the second HARQ process according to the subframe number of the subframe scheduled by using the multi-subframe scheduling signaling.

In a fifth possible implementation manner, with reference to the first aspect, the method further includes:

receiving, by the UE, data according to single-subframe scheduling signaling when the single-subframe scheduling signaling is received in a subframe scheduled by using multi-subframe scheduling signaling.

In a sixth possible implementation manner, with reference to the fifth possible implementation manner, after the receiving, by the UE, data according to single-subframe scheduling signaling when the single-subframe scheduling signaling is received in a subframe scheduled by using multi-subframe scheduling signaling, the method further includes:

receiving, in a subframe after a last subframe scheduled by using the multi-subframe scheduling signaling, data that is scheduled by using the multi-subframe scheduling signaling and that is in the subframe in which the single-subframe scheduling signaling is received.

In a seventh possible implementation manner, with reference to any possible implementation manner of the first possible implementation manner, the second possible implementation manner, the fifth possible implementation manner, and the sixth possible implementation manner, the single-subframe scheduling signaling is used to schedule data to be retransmitted.

In an eighth possible implementation manner, with reference to any possible implementation manner of the third possible implementation manner, the fourth possible implementation manner, the fifth possible implementation manner, and the sixth possible implementation manner, the multi-subframe scheduling signaling is used to schedule data to be newly transmitted.

According to a second aspect, a method for transmission by using scheduling signaling is provided, including:

receiving, by user equipment UE, scheduling signaling sent by a base station;

descrambling the received scheduling signaling according to a first scrambling code sequence and a second scrambling code sequence, to obtain first descrambled information and second descrambled information;

checking the first descrambled information and the second descrambled information;

determining, according to a check result, whether the scheduling signaling is multi-subframe scheduling signaling or single-subframe scheduling signaling; and receiving, by using the scheduling signaling, data sent by the base station.

In a first possible implementation manner, with reference to the second aspect, the determining, according to a check result, whether the scheduling signaling is multi-subframe scheduling signaling or single-subframe scheduling signaling includes:

if the first descrambled information is successfully checked, determining that the scheduling signaling is multi-subframe scheduling signaling, or if the second descrambled information is successfully checked, determining that the scheduling signaling is single-subframe scheduling signaling.

According to a third aspect, a method for transmission by using scheduling signaling is provided, including:

receiving, by UE by using scheduling signaling, transmission data sent by a base station, where the scheduling signaling includes single-subframe scheduling signaling or multi-subframe scheduling signaling;

determining whether the received transmission data is correct; and if the transmission data is received by using multi-subframe scheduling signaling, sending a feedback message to the base station by using a physical uplink channel resource that belongs to a first resource set, where the feedback message is obtained according to a determining result, and the feedback information includes: an acknowledgment character ACK or a negative acknowledgment character NACK; or if the transmission data is received by using single-subframe scheduling signaling, sending a feedback message to the base station by using a physical uplink channel resource that belongs to a second resource set, where the first resource set is different from the second resource set.

According to a fourth aspect, a method for transmission by using scheduling signaling is provided, including:

sending, by a base station, transmission data to UE by using scheduling signaling;

receiving feedback information that is sent by the UE by using a physical uplink channel resource, where the feedback information is determined by the UE according to a status of receiving the transmission data, and the feedback information includes: an acknowledgment character ACK or a negative acknowledgment character NACK; and determining, according to the physical uplink channel resource used for the feedback information, whether the transmission data is scheduled by using multi-subframe scheduling signaling or scheduled by using single-subframe scheduling signaling.

In a first possible implementation manner, with reference to the fourth aspect, the determining, according to the physical uplink channel resource used for the feedback information, whether the transmission data is scheduled by using multi-subframe scheduling signaling or scheduled by using single-subframe scheduling signaling includes:

if the physical uplink channel resource used for the feedback information belongs to a first resource set, determining that the transmission data is scheduled by using multi-subframe scheduling signaling, where the first resource set is configured by using higher layer signaling or is predefined; or if the physical uplink channel resource used for the feedback information belongs to a second resource set, determining that the transmission data is scheduled by using single-subframe scheduling signaling, where the second resource set is configured by using higher layer signaling or is predefined, where the first resource set is different from the second resource set.

According to a fifth aspect, user equipment is provided, including:

a receiving unit, configured to receive scheduling signaling sent by a base station, where the scheduling signaling includes a HARQ process number field;

an acquiring unit, configured to acquire a subframe number of a subframe scheduled by using the scheduling signaling, where the acquiring unit is further configured to determine a transport block according to the HARQ process number field received by the receiving unit, and the subframe number; and a processing unit, configured to process data in the transport block.

In a first possible implementation manner, with reference to the fifth aspect, the scheduling signaling is single-subframe scheduling signaling, the HARQ process number field is a first HARQ process number field, and the acquiring unit includes:

a first acquiring module, configured to perform calculation to obtain a first HARQ process according to the first HARQ process number field in the single-subframe scheduling signaling and the subframe number of the subframe scheduled by using the single-subframe scheduling signaling, where the first acquiring module is further configured to determine a first transport block in the first HARQ process according to a preset rule, or transport block configuration signaling in the single-subframe scheduling signaling, where the preset rule is a correspondence between a HARQ process and a transport block.

In a second possible implementation manner, with reference to the fifth aspect, the scheduling signaling is single-subframe scheduling signaling, the HARQ process number field is a first HARQ process number field, and the acquiring unit includes:

a second acquiring module, configured to perform calculation to obtain a first HARQ process according to the first HARQ process number field in the single-subframe scheduling signaling, where the second acquiring module is further configured to perform calculation to obtain a first transport block in the first HARQ process according to the subframe number of the subframe scheduled by using the single-subframe scheduling signaling.

In a third possible implementation manner, with reference to the fifth aspect, the scheduling signaling is multi-subframe scheduling signaling, the HARQ process number field is a second HARQ process number field, and the acquiring unit further includes:

a third acquiring module, configured to perform calculation to obtain a second HARQ process according to the second HARQ process number field in the multi-subframe scheduling signaling and the subframe number of the subframe scheduled by using the multi-subframe scheduling signaling, where the third acquiring module is further configured to determine a second transport block in the second HARQ process according to a preset rule, or transport block configuration signaling in the single-subframe scheduling signaling, where the preset rule is a correspondence between a HARQ process and a transport block.

In a fourth possible implementation manner, with reference to the fifth aspect, the scheduling signaling is multi-subframe scheduling signaling, the HARQ process number field is a second HARQ process number field, and the acquiring unit further includes:

a fourth acquiring module, configured to perform calculation to obtain a second HARQ process according to the second HARQ process number field in the multi-subframe scheduling signaling, where the fourth acquiring module is further configured to perform calculation to obtain a second transport block in the second HARQ process according to the subframe number of the subframe scheduled by using the multi-subframe scheduling signaling.

In a fifth possible implementation manner, with reference to the fifth aspect, the receiving unit is further configured to receive data according to single-subframe scheduling signaling when the single-subframe scheduling signaling is received in a subframe scheduled by using multi-subframe scheduling signaling.

In a sixth possible implementation manner, with reference to the fifth possible implementation manner, the processing unit is further configured to receive, in a subframe after a last subframe scheduled by using the multi-subframe scheduling signaling, data that is scheduled by using the multi-subframe scheduling signaling and that is in the subframe in which the single-subframe scheduling signaling is received.

In a seventh possible implementation manner, with reference to any possible implementation manner of the first possible implementation manner, the second possible implementation manner, the fifth possible implementation manner, and the sixth possible implementation manner, the single-subframe scheduling signaling is used to schedule data to be retransmitted.

In an eighth possible implementation manner, with reference to any possible implementation manner of the third possible implementation manner, the fourth possible implementation manner, the fifth possible implementation manner, and the sixth possible implementation manner, the multi-subframe scheduling signaling is used to schedule data to be newly transmitted.

According to a sixth aspect, user equipment is provided, including:

a receiving unit, configured to receive scheduling signaling sent by a base station;

a descrambling unit, configured to descramble the received scheduling signaling according to a first scrambling code sequence and a second scrambling code sequence, to obtain first descrambled information and second descrambled information;

a checking unit, configured to check the first descrambled information and the second descrambled information; and a processing unit, configured to determine, according to a check result, whether the scheduling signaling is multi-subframe scheduling signaling or single-subframe scheduling signaling, where the receiving unit is further configured to receive, by using the scheduling signaling, data sent by the base station.

In a first possible implementation manner, with reference to the sixth aspect, the processing unit includes:

a first determining module, configured to: if the first descrambled information is successfully checked, determine that the scheduling signaling is multi-subframe scheduling signaling, or a second determining module, configured to: if the second descrambled information is successfully checked, determine that the scheduling signaling is single-subframe scheduling signaling.

According to a seventh aspect, user equipment is provided, including:

a receiving unit, configured to receive, by using scheduling signaling, transmission data sent by a base station, where the scheduling signaling includes single-subframe scheduling signaling or multi-subframe scheduling signaling;

a determining unit, configured to determine whether the received transmission data is correct; and a sending unit, configured to: if the transmission data is received by using multi-subframe scheduling signaling, send a feedback message to the base station by using a physical uplink channel resource that belongs to a first resource set, where the feedback message is obtained according to a determining result, and the feedback information includes: an acknowledgment character ACK or a negative acknowledgment character NACK, where the sending unit is further configured to: if the transmission data is received by using single-subframe scheduling signaling, send a feedback message to the base station by using a physical uplink channel resource that belongs to a second resource set, where the first resource set is different from the second resource set.

According to an eighth aspect, a base station is provided, including:

a sending unit, configured to send transmission data to UE by using scheduling signaling;

a receiving unit, configured to receive feedback information that is sent by the UE by using a physical uplink channel resource, where the feedback information is determined by the UE according to a status of receiving the transmission data, and the feedback information includes: an acknowledgment character ACK or a negative acknowledgment character NACK; and a processing unit, configured to determine, according to the physical uplink channel resource used for the feedback information received by the receiving unit, whether the transmission data is scheduled by using multi-subframe scheduling signaling or scheduled by using single-subframe scheduling signaling.

In a first possible implementation manner, with reference to the eighth aspect, the processing unit includes:

a first determining module, configured to: if the physical uplink channel resource used for the feedback information received by the receiving unit belongs to a first resource set, determine that the transmission data is scheduled by using multi-subframe scheduling signaling, where the first resource set is configured by using higher layer signaling or is predefined; or a second determining module, configured to: if the physical uplink channel resource used for the feedback information belongs to a second resource set, determine that the transmission data is scheduled by using single-subframe scheduling signaling, where the second resource set is configured by using higher layer signaling or is predefined, where the first resource set is different from the second resource set.

According to a ninth aspect, user equipment is provided, including:

a receiver, configured to receive scheduling signaling sent by a base station, where the scheduling signaling includes a HARQ process number field; and a processor, configured to acquire a subframe number of a subframe scheduled by using the scheduling signaling, where the processor is further configured to determine a transport block according to the HARQ process number field received by the receiver, and the subframe number acquired by the processor; and the processor is further configured to process data in the transport block.

In a first possible implementation manner, with reference to the ninth aspect, the scheduling signaling is single-subframe scheduling signaling, the HARQ process number field is a first HARQ process number field, and the processor is specifically configured to:

perform calculation to obtain a first HARQ process according to the first HARQ process number field in the single-subframe scheduling signaling and the subframe number of the subframe scheduled by using the single-subframe scheduling signaling; and determine a first transport block in the first HARQ process according to a preset rule, or transport block configuration signaling in the single-subframe scheduling signaling, where the preset rule is a correspondence between a HARQ process and a transport block.

In a second possible implementation manner, with reference to the ninth aspect, the scheduling signaling is single-subframe scheduling signaling, the HARQ process number field is a first HARQ process number field, and the processor is specifically configured to:

perform calculation to obtain a first HARQ process according to the first HARQ process number field in the single-subframe scheduling signaling; and perform calculation to obtain a first transport block in the first HARQ process according to the subframe number of the subframe scheduled by using the single-subframe scheduling signaling.

In a third possible implementation manner, with reference to the ninth aspect, the scheduling signaling is multi-subframe scheduling signaling, the HARQ process number field is a second HARQ process number field, and the processor is specifically configured to:

perform calculation to obtain a second HARQ process according to the second HARQ process number field in the multi-subframe scheduling signaling and the subframe number of the subframe scheduled by using the multi-subframe scheduling signaling; and determine a second transport block in the second HARQ process according to a preset rule, or transport block configuration signaling in the multi-subframe scheduling signaling, where the preset rule is a correspondence between a HARQ process and a transport block.

In a fourth possible implementation manner, with reference to the ninth aspect, the scheduling signaling is multi-subframe scheduling signaling, the HARQ process number field is a second HARQ process number field, and the processor is specifically configured to:

perform calculation to obtain a second HARQ process according to the second HARQ process number field in the multi-subframe scheduling signaling; and perform calculation to obtain a second transport block in the second HARQ process according to the subframe number of the subframe scheduled by using the multi-subframe scheduling signaling.

In a fifth possible implementation manner, with reference to the ninth aspect, the receiver is further configured to receive, by the UE by using the at least one communications interface, data according to single-subframe scheduling signaling when the single-subframe scheduling signaling is received in a subframe scheduled by using multi-subframe scheduling signaling.

In a sixth possible implementation manner, with reference to the fifth possible implementation manner, the receiver is further configured to receive, by using the at least one communications interface, in a subframe after a last subframe scheduled by using the multi-subframe scheduling signaling, data that is scheduled by using the multi-subframe scheduling signaling and that is in the subframe in which the single-subframe scheduling signaling is received.

In a seventh possible implementation manner, with reference to any possible implementation manner of the first possible implementation manner, the second possible implementation manner, the fifth possible implementation manner, and the sixth possible implementation manner, the single-subframe scheduling signaling is used to schedule data to be retransmitted.

In an eighth possible implementation manner, with reference to any possible implementation manner of the third possible implementation manner, the fourth possible implementation manner, the fifth possible implementation manner, and the sixth possible implementation manner, the multi-subframe scheduling signaling is used to schedule data to be newly transmitted.

According to a tenth aspect, user equipment is provided, where the user equipment includes:

a receiver, configured to receive scheduling signaling sent by a base station; and a processor, configured to descramble, according to a first scrambling code sequence and a second scrambling code sequence, the scheduling signaling received by the receiver, to obtain first descrambled information and second descrambled information, where the processor is further configured to check the first descrambled information and the second descrambled information that are obtained by the processor;

the processor is further configured to determine, according to a check result obtained by the processor, whether the scheduling signaling is multi-subframe scheduling signaling or single-subframe scheduling signaling; and the receiver is further configured to receive, by using the scheduling signaling obtained by the processor, data sent by the base station.

In a first possible implementation manner, with reference to the tenth aspect, the processor is specifically configured to:

if the first descrambled information is successfully checked, determine that the scheduling signaling is multi-subframe scheduling signaling, or if the second descrambled information is successfully checked, determine that the scheduling signaling is single-subframe scheduling signaling.

According to an eleventh aspect, user equipment is provided, where the user equipment includes:

a receiver, configured to receive, by using scheduling signaling, transmission data sent by a base station, where the scheduling signaling includes single-subframe scheduling signaling or multi-subframe scheduling signaling;

a processor, configured to determine whether the transmission data received by the receiver is correct; and a transmitter, configured to: if the transmission data is received by using multi-subframe scheduling signaling, send a feedback message to the base station by using a physical uplink channel resource that belongs to a first resource set, where the feedback message is obtained according to a determining result, and the feedback information includes: an acknowledgment character ACK or a negative acknowledgment character NACK, where the transmitter is further configured to: if the transmission data is received by using single-subframe scheduling signaling, send a feedback message to the base station by using a physical uplink channel resource that belongs to a second resource set; and the first resource set is different from the second resource set.

According to a twelfth aspect, a base station is provided, where the base station includes:

a transmitter, configured to send transmission data to UE by using scheduling signaling;

a receiver, configured to receive feedback information that is sent by the UE by using a physical uplink channel resource, where the feedback information is determined by the UE according to a status of receiving the transmission data, and the feedback information includes: an acknowledgment character ACK or a negative acknowledgment character NACK; and a processor, configured to determine, according to the physical uplink channel resource used for the feedback information received by the receiver, whether the transmission data is scheduled by using multi-subframe scheduling signaling or scheduled by using single-subframe scheduling signaling.

In a first possible implementation manner, with reference to the twelfth aspect, the processor is specifically configured to:

if the physical uplink channel resource used for the feedback information belongs to a first resource set, determine that the transmission data is scheduled by using multi-subframe scheduling signaling, where the first resource set is configured by using higher layer signaling or is predefined; or if the physical uplink channel resource used for the feedback information belongs to a second resource set, determine that the transmission data is scheduled by using single-subframe scheduling signaling, where the second resource set is configured by using higher layer signaling or is predefined, where the first resource set is different from the second resource set.

According to the method for transmission by using scheduling signaling, and the apparatus that are provided in the embodiments of the present invention, a transport block is determined according to a HARQ process number field in subframe scheduling signaling and a subframe number of a subframe scheduled by using subframe scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
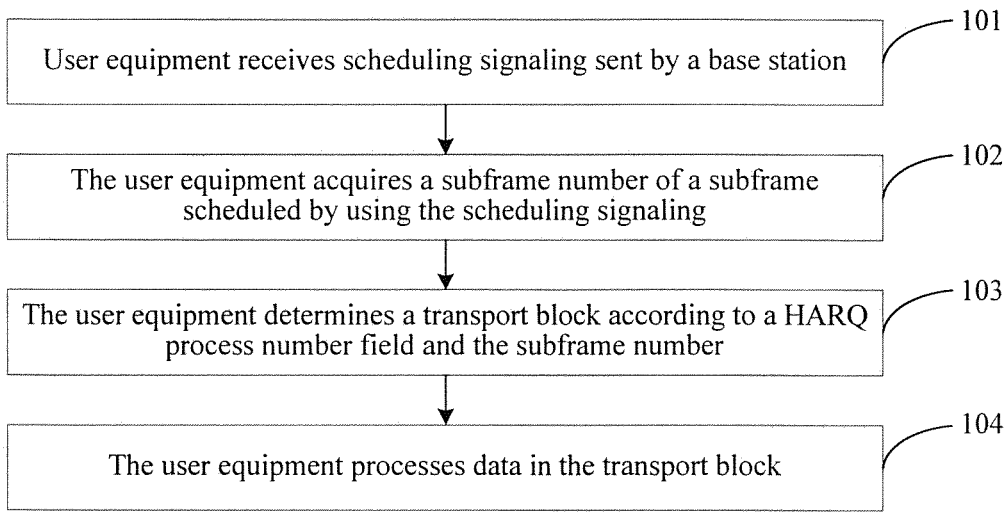
FIG. 1 is a schematic flowchart of a method for transmission by using scheduling signaling according to an embodiment of the present invention.

An embodiment of the present invention provides a method for transmission by using scheduling signaling. Referring FIG. 1, the method includes the following steps:

101. User equipment (UE) receives scheduling signaling sent by a base station.

The scheduling signaling may include a HARQ process number field.

The scheduling signaling may be single-subframe scheduling signaling and/or multi-subframe scheduling signaling. The single-subframe scheduling signaling refers to scheduling signaling that schedules only one subframe, and the multi-subframe scheduling signaling refers to scheduling signaling that schedules multiple subframes.

102. The user equipment acquires a subframe number of a subframe scheduled by using the scheduling signaling.

If the scheduling signaling is single-subframe scheduling signaling, the subframe number of the subframe scheduled by using the scheduling signaling may be a subframe number of a subframe scheduled by using the single-subframe scheduling signaling; if the scheduling signaling is multi-subframe scheduling signaling, the subframe number of the subframe scheduled by using the scheduling signaling may be a subframe number of a subframe scheduled by using the multi-subframe scheduling signaling; or if the scheduling signaling is single-subframe scheduling signaling and multi-subframe scheduling signaling, the subframe number of the subframe scheduled by using the scheduling signaling may be a subframe number of a subframe scheduled by using the single-subframe scheduling signaling and a subframe number of a subframe scheduled by using the multi-subframe scheduling signaling.

The subframe number of the subframe scheduled by using the scheduling signaling may be acquired by the UE by using a downlink signal.

103. The user equipment determines a transport block according to a HARQ process number field and the subframe number.

The determining a transport block according to a HARQ process number field and the subframe number may be: performing calculation to obtain a HARQ process according to the HARQ process number field in the scheduling signaling and the subframe number of the subframe scheduled by using the scheduling signaling, and then determining a transport block in the HARQ process; or performing calculation to obtain a HARQ process according to the HARQ process number field in the scheduling signaling, and then performing calculation to obtain a transport block according to the subframe number of the subframe scheduled by using the scheduling signaling.

104. The user equipment processes data in the transport block.

A scheduling priority of the single-subframe scheduling signaling is higher than a scheduling priority of the multi-subframe scheduling signaling, that is, when the subframe scheduled by using the single-subframe scheduling signaling and the subframe scheduled by using the multi-subframe scheduling signaling are a same subframe, the user equipment determines a transport block according to the HARQ process number field in the single-subframe scheduling signaling and the subframe number of the subframe scheduled by using the single-subframe scheduling signaling.

According to the method for transmission by using scheduling signaling provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads.

Figure 2:
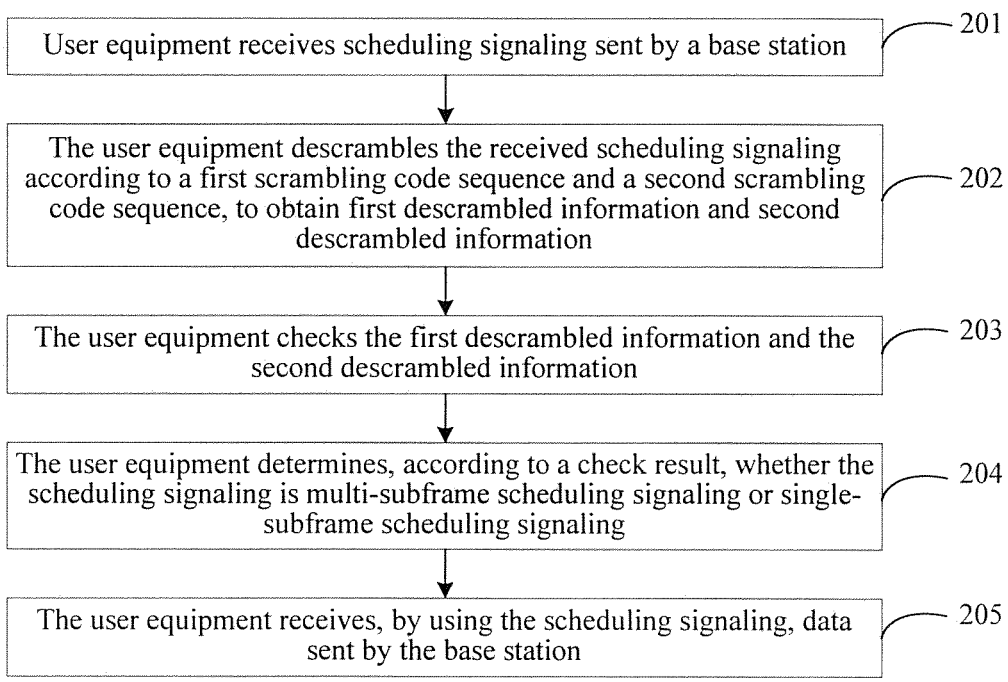
FIG. 2 is a schematic flowchart of another method for transmission by using scheduling signaling according to an embodiment of the present invention.

An embodiment of the present invention provides a method for transmission by using scheduling signaling. Referring to FIG. 2, the method includes the following steps:

201. User equipment receives scheduling signaling sent by a base station.

202. The user equipment descrambles the received scheduling signaling according to a first scrambling code sequence and a second scrambling code sequence, to obtain first descrambled information and second descrambled information.

The first scrambling code sequence and the second scrambling code sequence are preset by the UE or configured for the UE by the base station.

203. The user equipment checks the first descrambled information and the second descrambled information.

204. The user equipment determines, according to a check result, whether the scheduling signaling is multi-subframe scheduling signaling or single-subframe scheduling signaling.

The user equipment may determine, according to whether the first descrambled information is successfully checked or the second descrambled information is successfully checked, whether the scheduling signaling is multi-subframe scheduling signaling or single-subframe scheduling signaling.

205. The user equipment receives, by using the scheduling signaling, data sent by the base station.

Specifically, the user equipment can determine, according to a scrambling code of the received scheduling signaling, whether received data is scheduled by using single-subframe scheduling signaling or multi-subframe scheduling signaling, and does not need to rely on the base station to determine a type of the scheduling signaling, which is more convenient in a specific operation process.

According to the method for transmission by using scheduling signaling provided in this embodiment of the present invention, on a user equipment side, received scheduling signaling is descrambled, and checking is performed to determine whether the scheduling signaling is multi-subframe scheduling signaling or single-subframe scheduling signaling, which resolves a problem that user equipment cannot autonomously determine whether scheduling signaling is multi-subframe scheduling signaling or single-subframe scheduling signaling, reduces an operation procedure, and improves working efficiency.

Figure 3:
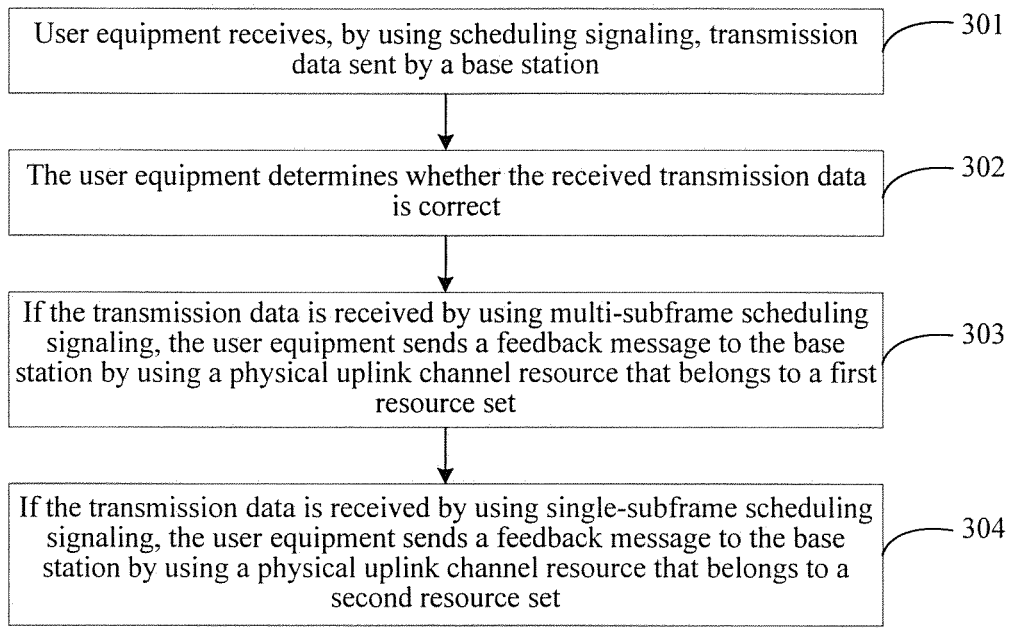
FIG. 3 is a schematic flowchart of still another method for transmission by using scheduling signaling according to an embodiment of the present invention.

An embodiment of the present invention provides a method for transmission by using scheduling signaling. Referring to FIG. 3, the method includes the following steps:

301. User equipment UE receives, by using scheduling signaling, transmission data sent by a base station.

The scheduling signaling includes single-subframe scheduling signaling or multi-subframe scheduling signaling.

The UE receives, according to the scheduling signaling, data transmitted by the base station in a subframe scheduled by using the scheduling signaling.

302. The user equipment determines whether the received transmission data is correct.

303. If the transmission data is received by using multi-subframe scheduling signaling, the user equipment sends a feedback message to the base station by using a physical uplink channel resource that belongs to a first resource set.

The feedback message is obtained according to a determining result, and the feedback information includes: an acknowledgement character (ACK) or a negative acknowledgement character (NACK).

Specifically, if the user equipment determines that the received transmission data is correct, the user equipment sends an ACK to the base station, or if the user equipment determines that the received transmission data is incorrect, the user equipment sends an NACK to the base station.

304. If the transmission data is received by using single-subframe scheduling signaling, the user equipment sends a feedback message to the base station by using a physical uplink channel resource that belongs to a second resource set.

The first resource set is different from the second resource set.

Specifically, the first resource set and the second resource set may be a physical uplink channel resource set that is predefined or that is configured for the UE by the base station by using higher layer signaling, and each of the first resource set and the second resource set includes at least one physical uplink channel resource. The physical uplink channel resource may be a resource used for sending a physical uplink control channel. A factor for determining a physical uplink channel resource is one or any combination of the following items: a time-frequency resource number, an orthogonal sequence number, and a cyclic shift location, where different time-frequency resource numbers, orthogonal sequence numbers, and cyclic shift locations correspond to different physical uplink channel resources. That the first resource set is different from the second resource set may include: time-frequency resource numbers, orthogonal sequence numbers, and/or cyclic shift locations of physical uplink channel resources in the first resource set and the second resource set are different.

According to the method for transmission by using scheduling signaling provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Figure 4:
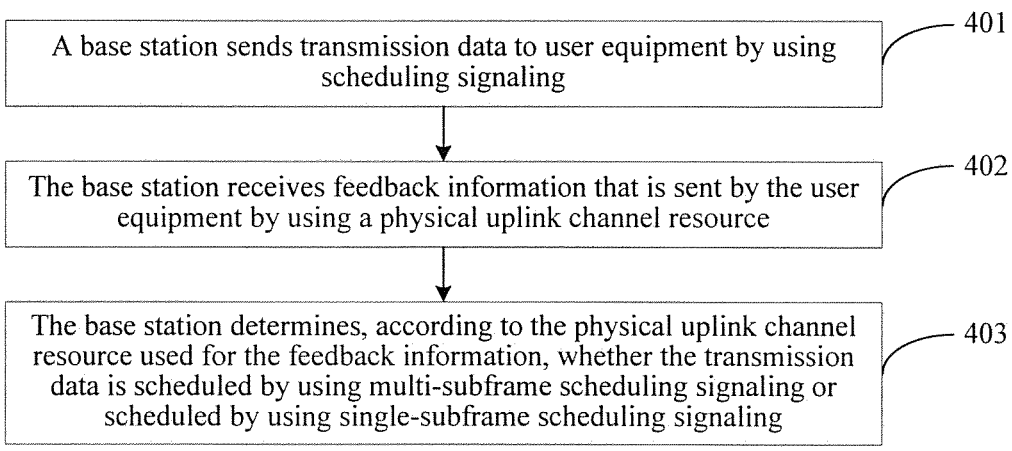
FIG. 4 is a schematic flowchart of yet another method for transmission by using scheduling signaling according to an embodiment of the present invention.

An embodiment of the present invention provides a method for transmission by using scheduling signaling. Referring to FIG. 4, the method includes the following steps:

401. A base station sends transmission data to user equipment UE by using scheduling signaling.

Specifically, the base station sends transmission data to the user equipment in a subframe scheduled by using the scheduling signaling.

402. The base station receives feedback information that is sent by the UE by using a physical uplink channel resource.

The feedback information is determined by the UE according to a status of receiving the transmission data, and the feedback information includes: an acknowledgment character ACK or a negative acknowledgment character NACK.

Specifically, if the received transmission data is correct, the base station may receive an ACK sent by the UE by using a physical uplink channel, or if the received transmission data is incorrect, the base station may receive an NACK that is sent by the UE by using a physical uplink channel.

403. The base station determines, according to the physical uplink channel resource used for the feedback information, whether the transmission data is scheduled by using multi-subframe scheduling signaling or scheduled by using single-subframe scheduling signaling.

The physical uplink channel may be a physical uplink control channel (PUCCH), a physical uplink shared channel (PUSCH), or the like.

Specifically, in this embodiment of the present invention, a base station mainly determines, according to a resource location in which a received physical uplink channel is located, a HARQ process corresponding to an ACK or an NACK, to determine whether received data is scheduled by using single-subframe scheduling signaling or scheduled by using multi-subframe scheduling signaling.

According to the method for transmission by using scheduling signaling provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Figure 5:
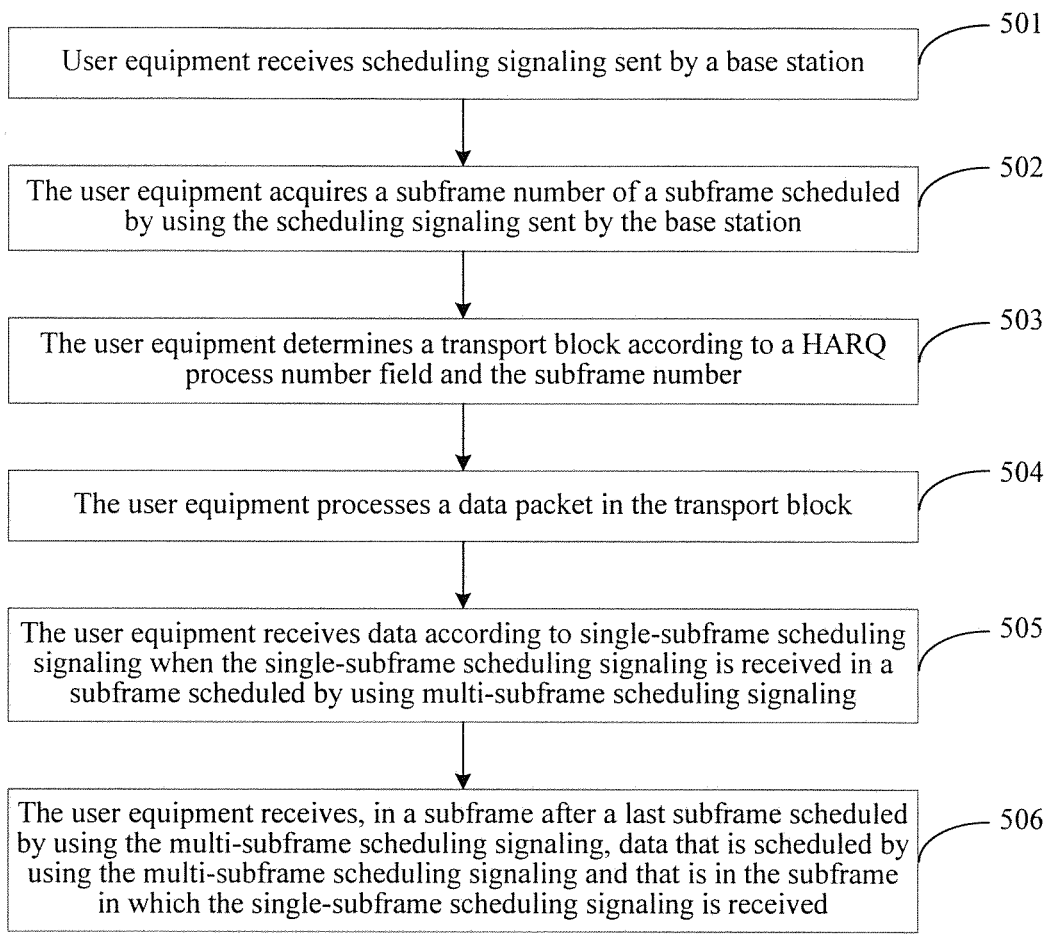
FIG. 5 is a schematic flowchart of a method for transmission by using scheduling signaling according to another embodiment of the present invention.

An embodiment of the present invention provides a method for transmission by using scheduling signaling. Referring to FIG. 5, the method includes the following steps:

501. User equipment receives scheduling signaling sent by a base station.

The scheduling signaling includes a HARQ process number field.

The scheduling signaling may be single-subframe scheduling signaling and/or multi-subframe scheduling signaling. The single-subframe scheduling signaling refers to scheduling signaling that schedules one subframe, and the multi-subframe scheduling signaling refers to scheduling signaling that schedules multiple subframes.

A scheduling priority of the single-subframe scheduling signaling is higher than a scheduling priority of the multi-subframe scheduling signaling.

502. The user equipment acquires a subframe number of a subframe scheduled by using the scheduling signaling sent by the base station.

If the scheduling signaling is single-subframe scheduling signaling, the subframe number of the subframe scheduled by using the scheduling signaling may be a subframe number of a subframe scheduled by using the single-subframe scheduling signaling; if the scheduling signaling is multi-subframe scheduling signaling, the subframe number of the subframe scheduled by using the scheduling signaling may be a subframe number of a subframe scheduled by using the multi-subframe scheduling signaling; or if the scheduling signaling is single-subframe scheduling signaling and multi-subframe scheduling signaling, the subframe number of the subframe scheduled by using the scheduling signaling may be a subframe number of a subframe scheduled by using the single-subframe scheduling signaling and a subframe number of a subframe scheduled by using the multi-subframe scheduling signaling.

The subframe number of the subframe scheduled by using the subframe scheduling signaling may be acquired by the UE by using a downlink signal.

503. The user equipment determines a transport block according to the HARQ process number field and the subframe number.

The determining a transport block according to a HARQ process number field and the subframe number may be: performing calculation to obtain a HARQ process according to the HARQ process number field in the scheduling signaling and the subframe number of the subframe scheduled by using the scheduling signaling, and then determining a transport block in the HARQ process; or performing calculation to obtain a HARQ process according to the HARQ process number field in the scheduling signaling, and then performing calculation to obtain a transport block according to the subframe number of the subframe scheduled by using the scheduling signaling.

504. The user equipment processes a data packet in the transport block.

Optionally, the method further includes the following steps:

505. The user equipment receives data according to single-subframe scheduling signaling when the single-subframe scheduling signaling is received in a subframe scheduled by using multi-subframe scheduling signaling.

In addition, the user equipment UE determines a HARQ process and a corresponding transport block according to the single-subframe scheduling signaling, instead of determining a HARQ process and a corresponding transport block by using the multi-subframe scheduling signaling.

506. The user equipment receives, in a subframe after a last subframe scheduled by using the multi-subframe scheduling signaling, data that is scheduled by using the multi-subframe scheduling signaling and that is in the subframe in which the single-subframe scheduling signaling is received.

In addition, the user equipment determines, in a subframe after a last subframe scheduled by using the multi-subframe scheduling signaling, a HARQ process and a corresponding transport block according to the multi-subframe scheduling signaling.

According to the method for transmission by using scheduling signaling provided in this embodiment of the present invention, a transport block is determined according to a HARQ process number field in subframe scheduling signaling and a subframe number of a subframe scheduled by using the subframe scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

Figure 6:
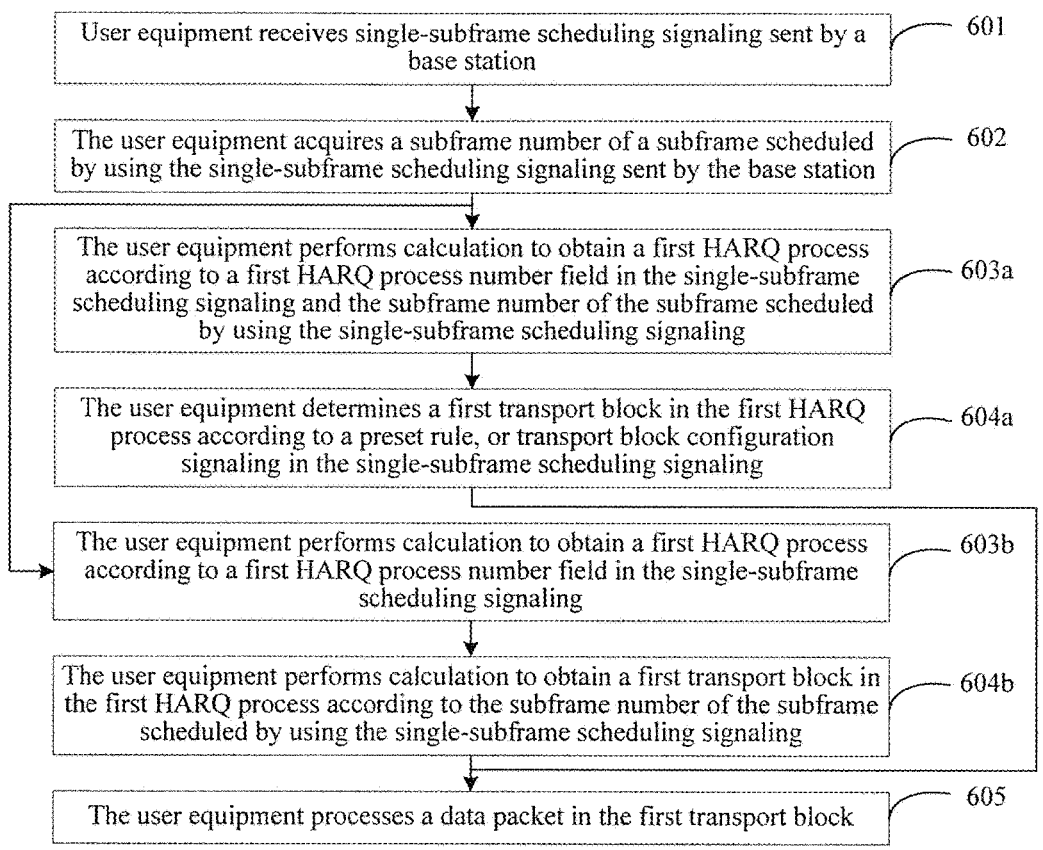
FIG. 6 is a schematic flowchart of another method for transmission by using scheduling signaling according to another embodiment of the present invention.

An embodiment of the present invention provides a method for transmission by using scheduling signaling. When a transport block is a transport block corresponding to single-subframe scheduling signaling, that is, a first transport block, referring to FIG. 6, the method includes the following steps:

601. User equipment receives single-subframe scheduling signaling sent by a base station.

The single-subframe scheduling signaling may include a first HARQ process number field.

Specifically, the single-subframe scheduling signaling refers to scheduling signaling used to notify scheduling information of only one subframe, where a scheduled subframe may be a subframe in which the single-subframe scheduling signaling is sent or a subframe after a subframe in which the single-subframe scheduling signaling is sent.

602. The user equipment acquires a subframe number of a subframe scheduled by using the single-subframe scheduling signaling sent by the base station.

After step 602, a first transport block may be determined according to step 603a and step 604a, and certainly, a first transport block may also be determined according to step 603b and step 604b.

Optionally, 603a. The user equipment performs calculation to obtain a first HARQ process according to a first HARQ process number field in the single-subframe scheduling signaling and the subframe number of the subframe scheduled by using the single-subframe scheduling signaling.

604a. The user equipment determines a first transport block in the first HARQ process according to a preset rule, or transport block configuration signaling in the single-subframe scheduling signaling.

The preset rule is a correspondence between a HARQ process and a transport block.

Alternatively, optionally, 603b. The user equipment performs calculation to obtain a first HARQ process according to a first HARQ process number field in the single-subframe scheduling signaling.

604b. The user equipment performs calculation to obtain a first transport block in the first HARQ process according to the subframe number of the subframe scheduled by using the single-subframe scheduling signaling.

The first transport block is a transport block corresponding to the single-subframe scheduling signaling.

605. The user equipment processes a data packet in the first transport block.

The single-subframe scheduling signaling is used to schedule data to be retransmitted.

Specifically, for example, the HARQ process number field included in the single-subframe scheduling signaling received by the UE is a field of three bits, and a decimal numerical value corresponding to the field is M, where M is a nonnegative integer. A subframe number of a subframe in which the single-subframe scheduling signaling is received is N, where N is a nonnegative integer. In this case, it is determined that the HARQ process is a process whose process number is equal to $M*P+\mod(N, P)$, where $\mod(N, P)$ is a remainder obtained after a division operation is performed on N and P. P may be a predefined numerical value, and a value of P is a positive integer, and may be, for example, 2, 4, 8, or another numerical value. P may also be a numerical value configured by the base station by using higher layer signaling, where the higher layer signaling is signaling at a Radio Resource Control (RRC) layer or signaling at a Media Access Control (MAC) layer. P may also be a numerical value configured by the base station by using dynamic signaling, where the dynamic signaling is a physical downlink control channel (PDCCH), or an enhanced physical downlink control channel (EPDCCH). Specifically, P may be a numerical value notified by using a newly added field in the dynamic signaling, or a numerical value configured by using a new data indicator (NDI) field in the dynamic signaling. If P is a numerical value configured by using an NDI field in the dynamic signaling, the single-subframe scheduling signaling is used to schedule only data to be retransmitted, and in this case, the NDI field is a redundant field, and therefore may be used to transmit P. An NDI in existing dynamic signaling has one or two bits in total; therefore, there are two or four candidate values of P that can be notified.

The following table provides an example in which a value of P is indicated by using a newly added field or an NDI in dynamic signaling, where the newly added field or the NDI has two bits.

| Newly added field or NDI | P |
|---|---|
| 00 | 2 |
| 01 | 4 |
| 10 | 8 |
| 11 | 1 or reserved value |

The following table provides another example in which a value of P is indicated by using a newly added field or an NDI in dynamic signaling, where the newly added field or the NDI has two bits, and a numerical value 1, a numerical value 2, a numerical value 3, and a numerical value 4 are notified to the UE by using higher layer signaling.

| Newly added field or NDI | P |
|---|---|
| 00 | Numerical value 1 |
| 01 | Numerical value 2 |
| 10 | Numerical value 3 |
| 11 | Numerical value 4 or reserved value |

Herein, an example in which P=4, and the UE separately receives, in the zeroth to eighth subframes, single-subframe scheduling signaling is used to describe a correspondence among a subframe number, a HARQ process number field, and a HARQ process number, as shown in the following table:

| Subframe number | 0 | 1 | 2 | 3 | 4 | 5 | 6 | 7 | 8 |
|---|---|---|---|---|---|---|---|---|---|
| HARQ process number field | 1 | 1 | 1 | 1 | 2 | 2 | 2 | 2 | 0 |
| HARQ process number | 4 | 5 | 6 | 7 | 8 | 9 | 10 | 11 | 0 |

The subframe number may be a subframe number in one radio frame, or may be a subframe number in multiple radio frames.

According to the method for transmission by using scheduling signaling provided in this embodiment of the present invention, a transport block is determined according to a HARQ process number field in scheduling signaling and a subframe number of a subframe scheduled by using the scheduling signaling, so that more HARQ processes or more transport blocks can be supported without increasing HARQ process number field overheads.

Figure 7:
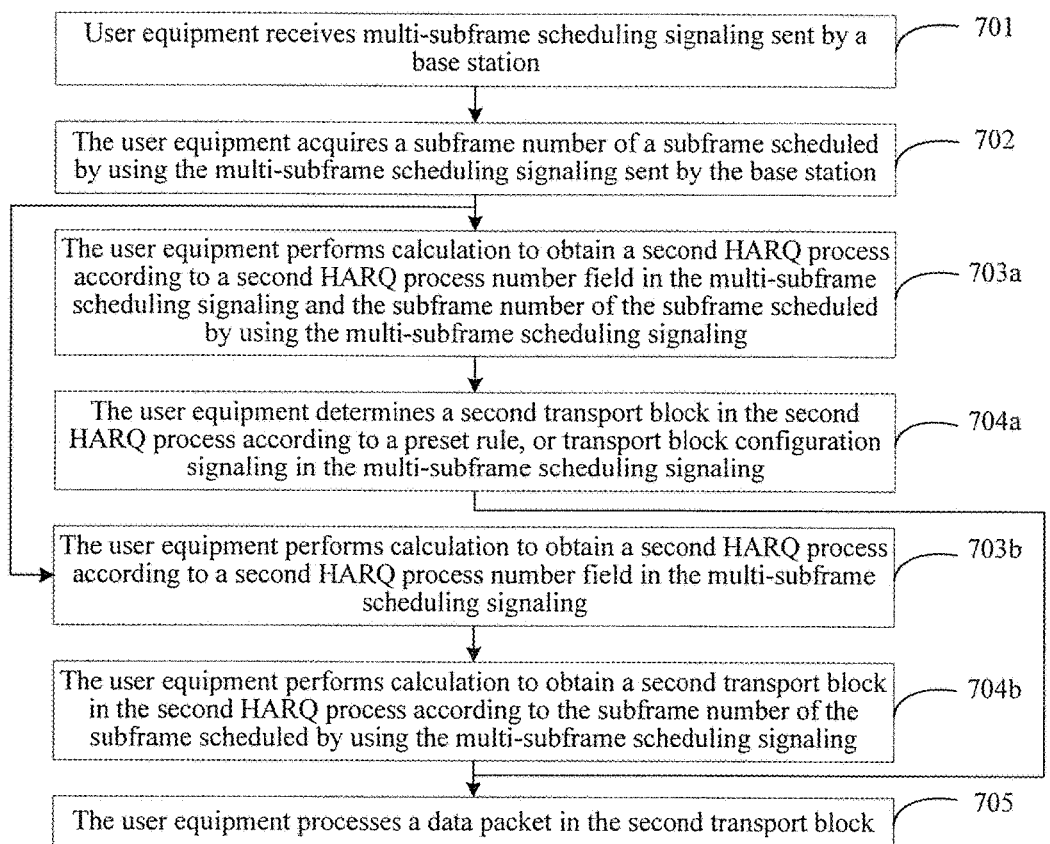
FIG. 7 is a schematic flowchart of still another method for transmission by using scheduling signaling according to another embodiment of the present invention.

An embodiment of the present invention provides a method for transmission by using scheduling signaling. When a transport block is a transport block corresponding to multi-subframe scheduling signaling, that is, a second transport block, referring to FIG. 7, the method includes the following steps:

701. User equipment receives multi-subframe scheduling signaling sent by a base station.

The multi-subframe scheduling signaling may include a second HARQ process number field.

Specifically, the multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

702. The user equipment acquires a subframe number of a subframe scheduled by using the multi-subframe scheduling signaling sent by the base station.

After step 702, a second transport block may be determined according to step 703a and step 704a, and certainly, a second transport block may also be determined according to step 703b and step 704b.

Optionally, 703a. The user equipment performs calculation to obtain a second HARQ process according to a second HARQ process number field in the multi-subframe scheduling signaling and the subframe number of the subframe scheduled by using the multi-subframe scheduling signaling.

704a. The user equipment determines a second transport block in the second HARQ process according to a preset rule, or transport block configuration signaling in the multi-subframe scheduling signaling.

The preset rule is a correspondence between a HARQ process and a transport block.

Alternatively, optionally, 703b. The user equipment performs calculation to obtain a second HARQ process according to a second HARQ process number field in the multi-subframe scheduling signaling.

704b. The user equipment performs calculation to obtain a second transport block in the second HARQ process according to the subframe number of the subframe scheduled by using the multi-subframe scheduling signaling.

The second transport block is a transport block in the multi-subframe scheduling signaling.

705. The user equipment processes a data packet in the second transport block.

The multi-subframe scheduling signaling is used to schedule data to be newly transmitted.

Specifically, that a second HARQ process is determined according to a second HARQ process number field in the multi-subframe scheduling signaling and the subframe number of the subframe scheduled by using the multi-subframe scheduling signaling may include: the HARQ process number field included in the multi-subframe scheduling signaling received by the UE is a field of three bits, and a decimal numerical value corresponding to the field is M, where M is a nonnegative integer; the subframe number of the subframe scheduled by using the multi-subframe scheduling signaling is N, where N is a nonnegative integer; and it is determined that the HARQ process is a process whose process number is $M*P+mod(N, P)$; or a subframe number of a first subframe scheduled by using the multi-subframe scheduling signaling is Q, where Q is a nonnegative integer, and it is determined that the HARQ process is a process whose process number is $M*P+N-Q$. Principles for designing the formula $M*P+mod(N, P)$ and the formula $M*P+N-Q$ are both to ensure that multiple subframes scheduled by using a same piece of multi-subframe scheduling signaling respectively correspond to different process numbers.

P may be a maximum quantity of subframes scheduled one time in multi-subframe scheduling; or P may be a quantity of subframes actually scheduled one time in multi-subframe scheduling; or P may be a predefined numerical value, and a value of P is a positive integer, and may be, for example, 2, 4, 8, or another numerical value. P may also be a numerical value configured by the base station by using higher layer signaling, where the higher layer signaling is signaling at an RRC layer or signaling at a MAC layer. P may also be a numerical value configured by the base station by using dynamic signaling, where the dynamic signaling is a PDCCH or an EPDCCH. Specifically, P may be a numerical value configured by using a newly added field in the dynamic signaling, or a numerical value configured by using a new data indicator NDI field in the dynamic signaling. If P is a numerical value configured by using an NDI field in the dynamic signaling, the multi-subframe scheduling signaling is used to schedule only data to be newly transmitted, and in this case, the NDI field is a redundant field, and therefore may be used to transmit P. An NDI in existing dynamic signaling has one or two bits in total; therefore, there are two or four candidate values of P that can be notified.

An example in which a value of P is indicated by using a newly added field or an NDI in dynamic signaling, and an example in which a value of P is notified to the UE by using higher layer signaling, a newly added field or an NDI in dynamic signaling indicates a value of P may be the same as that for single-subframe scheduling signaling, and details are not described herein again.

Herein, an example in which P=4, and the UE separately receives, in the zeroth and fourth subframes, multi-subframe scheduling signaling is used to describe a correspondence among a subframe number, a HARQ process number field, and a HARQ process number.

| Subframe number | 0 | 1 | 2 | 3 | 4 | 5 | 6 | 7 |
|---|---|---|---|---|---|---|---|---|
| HARQ process number field | 1 | | | | 2 | | | |
| HARQ process number | 4 | 5 | 6 | 7 | 8 | 9 | 10 | 11 |

According to the method for transmission by using scheduling signaling provided in this embodiment of the present invention, a transport block is determined according to a HARQ process number field in subframe scheduling signaling and a subframe number of a subframe scheduled by using the scheduling signaling, so that more HARQ processes or more transport blocks can be supported without increasing HARQ process number field overheads.

An embodiment of the present invention provides a method for transmission by using scheduling signaling. Scheduling signaling includes single-subframe scheduling signaling and multi-subframe scheduling signaling, and referring to FIG. 8, the method specifically includes the following steps:

801. User equipment receives single-subframe scheduling signaling sent by a base station.

The single-subframe scheduling signaling may include a first HARQ process number field.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

802. The user equipment receives multi-subframe scheduling signaling sent by the base station.

The multi-subframe scheduling signaling may include a second HARQ process number field.

Specifically, the multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling.

It should be noted that step 801 and step 802 are not performed in a sequential order, and generally may be performed simultaneously. In this embodiment of the present invention, an order in which step 801 and step 802 are performed is not limited herein, and in a specific implementation, implementation is performed in an order in which single-subframe scheduling signaling and multi-subframe scheduling signaling are received.

803. The user equipment acquires a subframe number of a subframe scheduled by using the single-subframe scheduling signaling sent by the base station.

804. The user equipment acquires a subframe number of a subframe scheduled by using the multi-subframe scheduling signaling sent by the base station.

It should be noted that step 803 and step 804 are not performed in a sequential order, and generally may be performed simultaneously. In this embodiment of the present invention, an order in which step 803 and step 804 are performed is not limited herein, in a specific implementation environment, a method for distinguishing an order in which step 803 and step 804 are performed is the same as a method for distinguishing an order in which step 801 and step 802 are performed, and details are not described herein again.

805. The user equipment performs calculation to obtain a first HARQ process according to a first HARQ process number field in the single-subframe scheduling signaling and the subframe number of the subframe scheduled by using the single-subframe scheduling signaling.

806. The user equipment determines a first transport block in the first HARQ process according to a preset rule, or transport block configuration signaling in the single-subframe scheduling signaling.

The preset rule is a correspondence between a HARQ process and a transport block.

807. The user equipment performs calculation to obtain a second HARQ process according to a second HARQ process number field in the multi-subframe scheduling signaling and the subframe number of the subframe scheduled by using the multi-subframe scheduling signaling.

808. The user equipment determines a second transport block in the second HARQ process according to a preset rule, or transport block configuration signaling in the multi-subframe scheduling signaling.

The preset rule is a correspondence between a HARQ process and a transport block.

It should be noted that step 805 and step 806, and step 807 and step 808 are not performed in a sequential order, and generally, step 805 and step 806, and step 807 and step 808 may be performed simultaneously. In this embodiment of the present invention, an order in which step 805 and step 806, and step 807 and step 808 are performed is not limited herein, in a specific implementation environment, a method for distinguishing an order in which step 805 and step 806, and step 807 and step 808 are performed is the same as a method for distinguishing an order in which step 801 and step 802 are performed, and details are not described herein again.

Specifically, when single-subframe scheduling signaling is used to schedule data, a specific example may be: the HARQ process number field included in the single-subframe scheduling signaling received by the UE is a field of three bits, and a decimal numerical value corresponding to the field is M, where M is a nonnegative integer. A subframe number of a subframe in which the single-subframe scheduling signaling is received is N, where N is a nonnegative integer. In this case, it is determined that the HARQ process is a process whose process number is equal to $M*P+\mod(N, P)$, where $\mod(N, P)$ is a remainder obtained after a division operation is performed on N and P. P may be a predefined numerical value, and a value of P is a positive integer, and may be, for example, 2, 4, 8, or another numerical value. P may also be a numerical value configured by the base station by using higher layer signaling, where the higher layer signaling is signaling at a Radio Resource Control (RRC) layer or signaling at a Media Access Control (MAC) layer. P may also be a numerical value configured by the base station by using dynamic signaling, where the dynamic signaling is a physical downlink control channel (PDCCH), or an enhanced physical downlink control channel (EPDCCH). Specifically, P may be a numerical value configured by using a newly added field in the dynamic signaling, or a numerical value configured by using a new data indicator (NDI) field in the dynamic signaling. If P is a numerical value configured by using an NDI field in the dynamic signaling, the single-subframe scheduling signaling is used to schedule only data to be retransmitted, and in this case, the NDI field is a redundant field, and therefore may be used to transmit P. An NDI in existing dynamic signaling has one or two bits in total; therefore, there are two or four candidate values of P that can be notified.

The following table provides an example in which a value of P is indicated by using a newly added field or an NDI in dynamic signaling, where the newly added field or the NDI has two bits.

| Newly added field or NDI | P |
|---|---|
| 00 | 2 |
| 01 | 4 |
| 10 | 8 |
| 11 | 1 or reserved value |

The following table provides another example in which a value of P is indicated by using a newly added field or an NDI in dynamic signaling, where the newly added field or the NDI has two bits, and a numerical value 1, a numerical value 2, a numerical value 3, and a numerical value 4 are notified to the UE by using higher layer signaling.

| Newly added field or NDI | P |
|---|---|
| 00 | Numerical value 1 |
| 01 | Numerical value 2 |
| 10 | Numerical value 3 |
| 11 | Numerical value 4 or reserved value |

Herein, an example in which P=4, and the UE separately receives, in the zeroth to eighth subframes, single-subframe scheduling signaling is used to describe a correspondence among a subframe number, a HARQ process number field, and a HARQ process number, as shown in the following table:

| Subframe number | 0 | 1 | 2 | 3 | 4 | 5 | 6 | 7 | 8 |
|---|---|---|---|---|---|---|---|---|---|
| HARQ process number field | 1 | 1 | 1 | 1 | 2 | 2 | 2 | 2 | 0 |
| HARQ process number | 4 | 5 | 6 | 7 | 8 | 9 | 10 | 11 | 0 |

The subframe number may be a subframe number in one radio frame, or may be a subframe number in multiple radio frames.

Certainly, when multi-subframe scheduling signaling is used to schedule data, a specific example may be: that a second HARQ process is determined according to a second HARQ process number field in the multi-subframe scheduling signaling and the subframe number of the subframe scheduled by using the multi-subframe scheduling signaling may be: the HARQ process number field included in the multi-subframe scheduling signaling received by the UE is a field of three bits, and a decimal numerical value corresponding to the field is M, where M is a nonnegative integer; the subframe number of the subframe scheduled by using the multi-subframe scheduling signaling is N, where N is a nonnegative integer; and it is determined that the HARQ process is a process whose process number is $M*P+\mod(N, P)$; or a subframe number of a first subframe scheduled by using the multi-subframe scheduling signaling is Q, where Q is a nonnegative integer, and it is determined that the HARQ process is a process whose process number is $M*P+N-Q$. Principles for designing the formula $M*P+\mod(N, P)$ and the formula $M*P+N-Q$ are both to ensure that multiple subframes scheduled by using a same piece of multi-subframe scheduling signaling respectively correspond to different process numbers.

P may be a maximum quantity of subframes scheduled one time in multi-subframe scheduling; or P may be a quantity of subframes actually scheduled one time in multi-subframe scheduling; or P may be a predefined numerical value, and a value of P is a positive integer, and may be, for example, 2, 4, 8, or another numerical value. P may also be a numerical value configured by the base station by using higher layer signaling, where the higher layer signaling is signaling at an RRC layer or signaling at a MAC layer. P may also be a numerical value configured by the base station by using dynamic signaling, where the dynamic signaling is a PDCCH or an EPDCCH. Specifically, P may be a numerical value configured by using a newly added field in the dynamic signaling, or a numerical value configured by using a new data indicator NDI field in the dynamic signaling. If P is a numerical value configured by using an NDI field in the dynamic signaling, the multi-subframe scheduling signaling is used to schedule only data to be newly transmitted, and in this case, the NDI field is a redundant field, and therefore may be used to transmit P. An NDI in existing dynamic signaling has one or two bits in total; therefore, there are two or four candidate values of P that can be notified.

An example in which a value of P is indicated by using a newly added field or an NDI in dynamic signaling, and an example in which a value of P is notified to the UE by using higher layer signaling, a newly added field or an NDI in dynamic signaling indicates a value of P may be the same as that for single-subframe scheduling signaling, and details are not described herein again.

Herein, an example in which P=4, and the UE separately receives, in the zeroth and fourth subframes, multi-subframe scheduling signaling is used to describe a correspondence among a subframe number, a HARQ process number field, and a HARQ process number.

| Subframe number | 0 | 1 | 2 | 3 | 4 | 5 | 6 | 7 |
|---|---|---|---|---|---|---|---|---|
| HARQ process number field | 1 | | | | 2 | | | |
| HARQ process number | 4 | 5 | 6 | 7 | 8 | 9 | 10 | 11 |

Optionally, the method in this embodiment further includes the following steps:

809. The user equipment processes a data packet in the first transport block.

810. The user equipment processes a data packet in the second transport block.

It should be noted that step 809 and step 810 are not performed in a sequential order, and generally may be performed simultaneously. In this embodiment of the present invention, an order in which step 809 and step 810 are performed is not limited herein, and in a specific implementation, implementation is performed in an order in which single-subframe scheduling signaling and multi-subframe scheduling signaling are received.

The multi-subframe scheduling signaling is used to schedule data to be newly transmitted.

The single-subframe scheduling signaling is used to schedule data to be retransmitted.

According to the method for transmission by using scheduling signaling provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

An embodiment of the present invention provides a method for transmission by using scheduling signaling. Scheduling signaling includes single-subframe scheduling signaling and multi-subframe scheduling signaling, and referring to FIG. 9, the method specifically includes the following steps:

901. User equipment receives single-subframe scheduling signaling sent by a base station.

The single-subframe scheduling signaling may include a first HARQ process number field.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

902. The user equipment receives multi-subframe scheduling signaling sent by the base station.

The multi-subframe scheduling signaling may include a second HARQ process number field.

Specifically, the multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling.

It should be noted that step 901 and step 902 are not performed in a sequential order, and generally may be performed simultaneously. In this embodiment of the present invention, an order in which step 901 and step 902 are performed is not limited herein, and in a specific implementation, implementation is performed in an order in which single-subframe scheduling signaling and multi-subframe scheduling signaling are received.

903. The user equipment acquires a subframe number of a subframe scheduled by using the single-subframe scheduling signaling sent by the base station.

904. The user equipment acquires a subframe number of a subframe scheduled by using the multi-subframe scheduling signaling sent by the base station.

It should be noted that step 903 and step 904 are not performed in a sequential order, and generally may be performed simultaneously. In this embodiment of the present invention, an order in which step 903 and step 904 are performed is not limited herein, in a specific implementation environment, a method for distinguishing an order in which step 903 and step 904 are performed is the same as a method for distinguishing an order in which step 901 and step 902 are performed, and details are not described herein again.

905. The user equipment performs calculation to obtain a first HARQ process according to a first HARQ process number field in the single-subframe scheduling signaling.

906. The user equipment performs calculation to obtain a first transport block in the first HARQ process according to the subframe number of the subframe scheduled by using the single-subframe scheduling signaling.

907. The user equipment performs calculation to obtain a second HARQ process according to a second HARQ process number field in the multi-subframe scheduling signaling.

908. The user equipment performs calculation to obtain a second transport block in the second HARQ process according to the subframe number of the subframe scheduled by using the multi-subframe scheduling signaling.

It should be noted that step 905 and step 906, and step 907 and step 908 are not performed in a sequential order, and generally, step 905 and step 906, and step 907 and step 908 may be performed simultaneously. In this embodiment of the present invention, an order in which step 905 and step 906, and step 907 and step 908 are performed is not limited herein, in a specific implementation environment, a method for distinguishing an order in which step 905 and step 906, and step 907 and step 908 are performed is the same as a method for distinguishing an order in which step 901 and step 902 are performed, and details are not described herein again.

Specifically, the HARQ process number field included in the single-subframe scheduling signaling received by the UE is a field of three bits, and a decimal numerical value corresponding to the field is M, where M is a nonnegative integer. A subframe number of a subframe in which the single-subframe scheduling signaling is received is N, where N is a nonnegative integer. In this case, it is determined that the HARQ process is a process whose process number is M, and it is determined that a transport block in the HARQ process is a transport block of the $(\text{mod}(N, P))^{th}$ group, where mod(N, P) is a remainder obtained after a division operation is performed on N and P. Each group of transport blocks includes one or two transport blocks, and in each subframe, only one group of transport blocks is transmitted. P is a predefined numerical value, and a value of P is a positive integer, and may be, for example, 2, 4, 8, or another numerical value. A method for configuring P is the same as the method in the embodiment corresponding to FIG. 8, and details are not described herein again.

Herein, an example in which P=4, and the UE separately receives, in the zeroth to eighth subframes, single-subframe scheduling signaling is used to describe a correspondence among a subframe number, a HARQ process number field, and a HARQ process number, as shown in the following table:

| Subframe number | 0 | 1 | 2 | 3 | 4 | 5 | 6 | 7 | 8 |
|---|---|---|---|---|---|---|---|---|---|
| HARQ process number field | 1 | 1 | 1 | 1 | 2 | 2 | 2 | 2 | 0 |
| HARQ process number | 1 | 1 | 1 | 1 | 2 | 2 | 2 | 2 | 0 |
| Transport block group number | 0 | 1 | 2 | 3 | 0 | 1 | 2 | 3 | 0 |

Specifically, for multi-subframe scheduling signaling, the HARQ process number field included in the multi-subframe scheduling signaling received by the UE is a field of three bits, a decimal numerical value corresponding to the field is M, and the subframe number of the subframe scheduled by using the multi-subframe scheduling signaling is N; in this case, it is determined that the HARQ process is a process whose process number is M, and it is determined that a transport block in the HARQ process is a transport block of the $(\text{mod}(N, P))^{th}$ group. Each group of transport blocks includes one or two transport blocks, and in each subframe, only one group of transport blocks is transmitted. P is a predefined numerical value, and a value of P is a positive integer, and may be, for example, 2, 4, 8, or another numerical value. Methods for configuring P are the same in this embodiment, and details are not described herein again.

Alternatively, the subframe number of the subframe scheduled by using the multi-subframe scheduling signaling is N, and a subframe number of a first subframe scheduled by using the multi-subframe scheduling signaling is Q; in this case, it is determined that the HARQ process is a process whose process number is M, and it is determined that a transport block in the HARQ process is a transport block of the $(N-Q)^{th}$ group. Each group of transport blocks includes one or two transport blocks, and in each subframe, only one group of transport blocks is transmitted. P is a predefined numerical value, and a value of P is a positive integer, and may be, for example, 2, 4, 8, or another numerical value. A method for configuring P is the same as the method in the embodiment corresponding to FIG. 8, and details are not described herein again.

Herein, an example in which P=4, and the UE separately receives, in the zeroth and fourth subframes, multi-subframe scheduling signaling is used to describe a correspondence among a subframe number, a HARQ process number field, a HARQ process number, and a transport block group number, as shown in the following table:

| Subframe number | 0 | 1 | 2 | 3 | 4 | 5 | 6 | 7 |
|---|---|---|---|---|---|---|---|---|
| HARQ process number field | 1 | | | | 2 | | | |
| HARQ process number | 1 | 1 | 1 | 1 | 2 | 2 | 2 | 2 |
| Transport block group number | 0 | 1 | 2 | 3 | 0 | 1 | 2 | 3 |

Further, the method further includes the following steps:

909. The user equipment processes a data packet in the first transport block.

910. The user equipment processes a data packet in the second transport block.

It should be noted that step 909 and step 910 are not performed in a sequential order, and generally may be performed simultaneously. In this embodiment of the present invention, an order in which step 909 and step 910 are performed is not limited herein, and in a specific implementation, implementation is performed in an order in which single-subframe scheduling signaling and multi-subframe scheduling signaling are received.

The multi-subframe scheduling signaling is used to schedule data to be newly transmitted.

The single-subframe scheduling signaling is used to schedule data to be retransmitted.

According to the method for transmission by using scheduling signaling provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

An embodiment of the present invention provides a method for transmission by using scheduling signaling. A transport block includes a first transport block and a second transport block, and referring to FIG. 10, the method specifically includes the following steps:

1001. User equipment receives single-subframe scheduling signaling sent by a base station.

The single-subframe scheduling signaling may include a first HARQ process number field.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

1002. The user equipment receives multi-subframe scheduling signaling sent by the base station.

The multi-subframe scheduling signaling may include a second HARQ process number field.

Specifically, the multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling.

It should be noted that step 1001 and step 1002 are not performed in a sequential order, and generally, step 1001 and step 1002 may be performed simultaneously. In this embodiment of the present invention, an order in which step 1001 and step 1002 are performed is not limited herein, and in a specific implementation, implementation is performed in an order in which single-subframe scheduling signaling and multi-subframe scheduling signaling are received.

1003. The user equipment acquires a subframe number of a subframe scheduled by using the single-subframe scheduling signaling sent by the base station.

1004. The user equipment acquires a subframe number of a subframe scheduled by using the multi-subframe scheduling signaling sent by the base station.

It should be noted that step 1003 and step 1004 are not performed in a sequential order, and generally, step 1003 and step 1004 may be performed simultaneously. In this embodiment of the present invention, an order in which step 1003 and step 1004 are performed is not limited herein, in a specific implementation environment, a method for distinguishing an order in which step 1003 and step 1004 are performed is the same as a method for distinguishing an order in which step 1001 and step 1002 are performed, and details are not described herein again.

1005. The user equipment performs calculation to obtain a first HARQ process according to a first HARQ process number field in the single-subframe scheduling signaling and the subframe number of the subframe scheduled by using the single-subframe scheduling signaling.

1006. The user equipment determines a first transport block in the first HARQ process according to a preset rule, or transport block configuration signaling in the single-subframe scheduling signaling.

1007. The user equipment performs calculation to obtain a second HARQ process according to a second HARQ process number field in the multi-subframe scheduling signaling and the subframe number of the subframe scheduled by using the multi-subframe scheduling signaling.

1008. The user equipment determines a second transport block in the second HARQ process according to a preset rule, or transport block configuration signaling in the multi-subframe scheduling signaling.

The preset rule is a correspondence between a HARQ process and a transport block.

1009. The user equipment processes a data packet in the first transport block.

1010. The user equipment receives data according to single-subframe scheduling signaling when the single-subframe scheduling signaling is received in the subframe scheduled by using the multi-subframe scheduling signaling.

1011. The user equipment receives, in a subframe after a last subframe scheduled by using the multi-subframe scheduling signaling, data that is scheduled by using the multi-subframe scheduling signaling and that is in the subframe in which the single-subframe scheduling signaling is received.

Specifically, an example in which the UE receives, in the zeroth subframe, multi-subframe scheduling signaling, and receives, in the first subframe, single-subframe scheduling signaling is used for description. The UE determines, in the first subframe, a HARQ process and a corresponding transport block group according to the single-subframe scheduling signaling, and processes, according to the single-subframe scheduling signaling, a transport block, corresponding to the transport block group, in the HARQ process. Further, the UE determines, in the fourth subframe, a HARQ process and a corresponding transport block group according to the multi-subframe scheduling signaling and the first subframe, and processes, according to the multi-subframe scheduling signaling, a transport block, corresponding to the transport block group, in the HARQ process. A relationship among a subframe number, a HARQ process number field in multi-subframe scheduling signaling, a HARQ process number determined according to multi-subframe scheduling signaling, a transport block group number determined according to multi-subframe scheduling signaling, a HARQ process number field in single-subframe scheduling signaling, a HARQ process number determined according to single-subframe scheduling signaling, a transport block group number determined according to single-subframe scheduling signaling, a HARQ process number processed by the UE, and a transport block group number processed by the UE is shown in the following table:

| Subframe number | 0 | 1 | 2 | 3 | 4 | 5 | 6 | 7 |
|---|---|---|---|---|---|---|---|---|
| HARQ process number field in multi-subframe scheduling signaling | 1 | | | | | | | |
| HARQ process number determined according to multi-subframe scheduling signaling | 1 | 1 | 1 | 1 | | | | |
| Transport block group number determined according to multi-subframe scheduling signaling | 0 | 1 | 2 | 3 | | | | |
| HARQ process number field in single-subframe scheduling signaling | | 3 | | | | | | |
| HARQ process number determined according to single-subframe scheduling signaling | | 3 | | | | | | |
| Transport block group number determined according to single-subframe scheduling signaling | | 1 | | | | | | |
| HARQ process number processed by UE | 1 | 3 | 1 | 1 | 1 | | | |
| Transport block group number processed by UE | 0 | 1 | 2 | 3 | 1 | | | |

Single-subframe scheduling signaling is received in a subframe that is scheduled by using the multi-subframe scheduling signaling and whose subframe number is 1; therefore, data that is originally transmitted in the first subframe and that is in a process whose multi-subframe scheduled HARQ process number is 1 and whose corresponding multi-subframe scheduled transport block group number is 1 is replaced with data in a process whose HARQ process number is determined as 3 by the single-subframe scheduling signaling and whose corresponding transport block group number is determined as 1 by the single-subframe scheduling signaling. Data in a process whose HARQ process number is determined as 1 by the multi-subframe scheduling signaling and whose transport block group number is determined as by the multi-subframe scheduling signaling 1 is received in a subframe that is after a last subframe and whose subframe number is 4. In this way, when single-subframe scheduling and multi-subframe scheduling occur in a same subframe, misunderstanding of the UE can be avoided.

The multi-subframe scheduling signaling is used to schedule data to be newly transmitted.

The single-subframe scheduling signaling is used to schedule data to be retransmitted.

Figure 8:
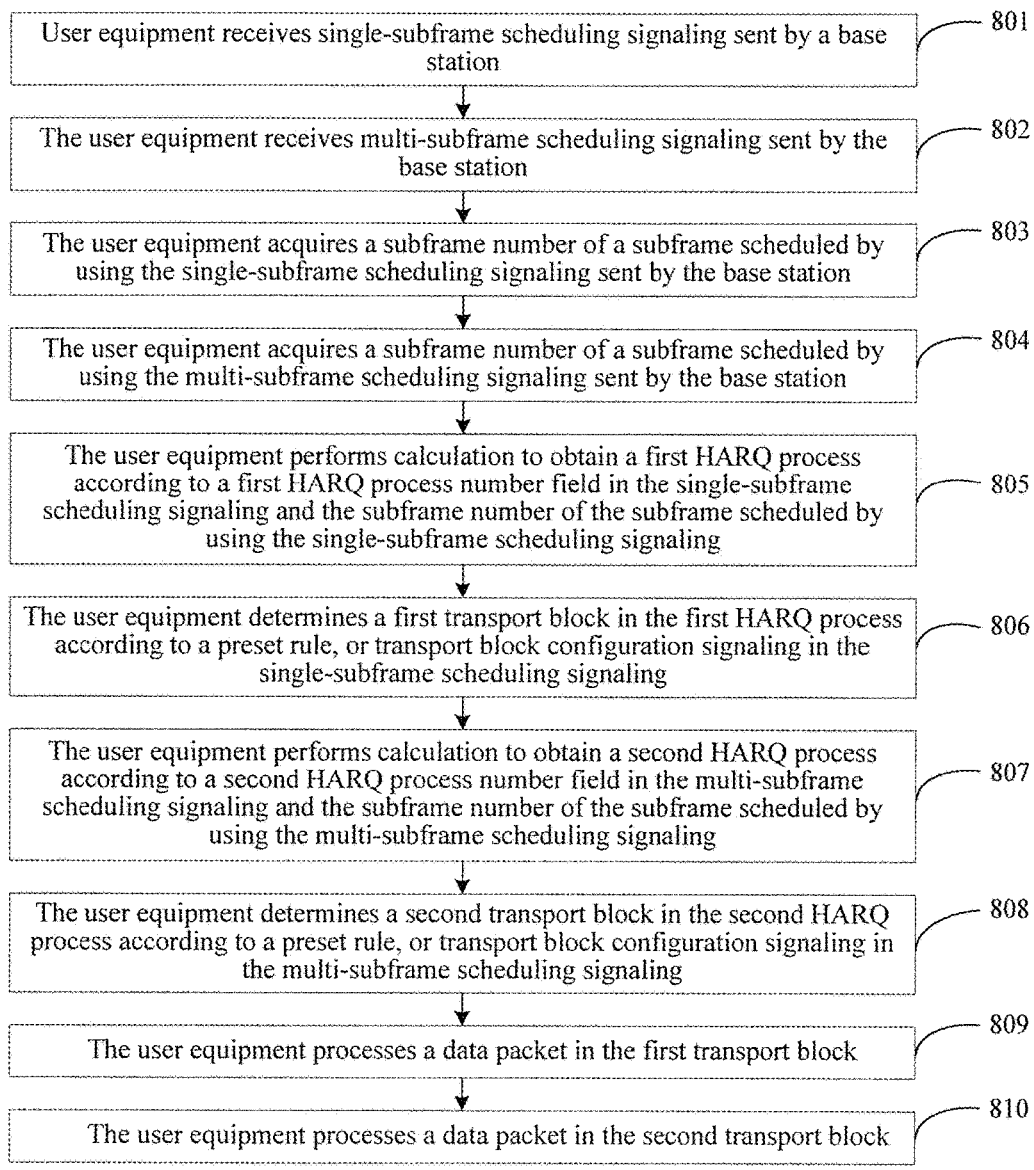
FIG. 8 is a schematic flowchart of yet another method for transmission by using scheduling signaling according to another embodiment of the present invention.

It should be noted that, for an explanation of other steps in this embodiment, refer to the detailed description in the embodiment corresponding to FIG. 8 in the foregoing embodiments, and details are not described herein again.

According to the method for transmission by using scheduling signaling provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

Figure 11:
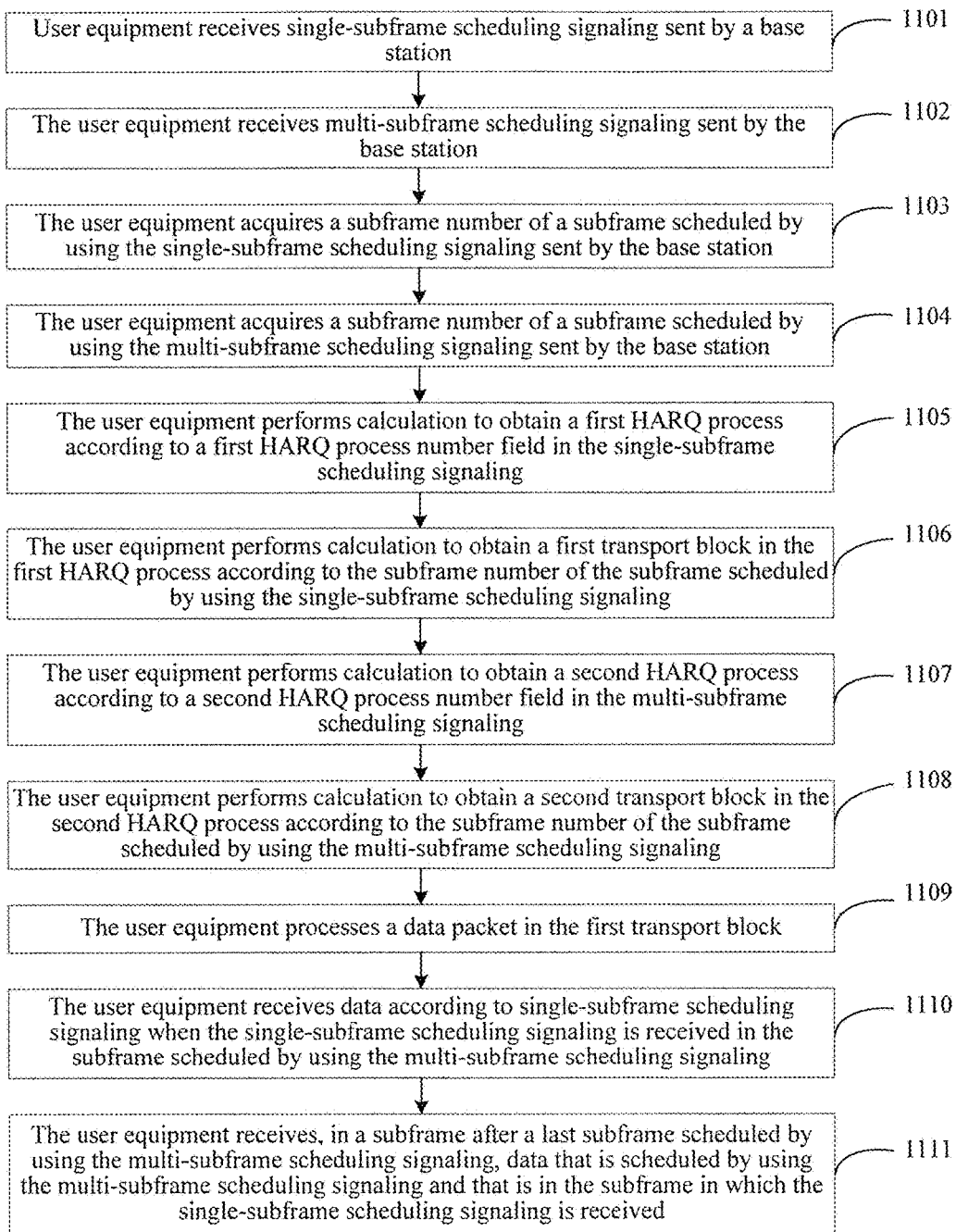
FIG. 11 is a schematic flowchart of still another method for transmission by using scheduling signaling according to still another embodiment of the present invention.

An embodiment of the present invention provides a method for transmission by using scheduling signaling. Scheduling signaling includes single-subframe scheduling signaling and multi-subframe scheduling signaling, and referring to FIG. 11, the method specifically includes the following steps:

1101. User equipment receives single-subframe scheduling signaling sent by a base station.

The single-subframe scheduling signaling may include a first HARQ process number field.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

1102. The user equipment receives multi-subframe scheduling signaling sent by the base station.

The multi-subframe scheduling signaling may include a second HARQ process number field.

Specifically, the multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling.

It should be noted that step 1101 and step 1102 are not performed in a sequential order, and generally, step 1101 and step 1102 may be performed simultaneously. In this embodiment of the present invention, an order in which step 1101 and step 1102 are performed is not limited herein, and, in a specific implementation, implementation is performed in an order in which single-subframe scheduling signaling and multi-subframe scheduling signaling are received.

1103. The user equipment acquires a subframe number of a subframe scheduled by using the single-subframe scheduling signaling sent by the base station.

1104. The user equipment acquires a subframe number of a subframe scheduled by using the multi-subframe scheduling signaling sent by the base station.

It should be noted that step 1103 and step 1104 are not performed in a sequential order, and generally, step 1103 and step 1104 may be performed simultaneously. In this embodiment of the present invention, an order in which step 1103 and step 1104 are performed is not limited herein, in a specific implementation environment, a method for distinguishing an order in which step 1103 and step 1104 are performed is the same as a method for distinguishing an order in which step 1101 and step 1102 are performed, and details are not described herein again.

1105. The user equipment performs calculation to obtain a first HARQ process according to a first HARQ process number field in the single-subframe scheduling signaling.

1106. The user equipment performs calculation to obtain a first transport block in the first HARQ process according to the subframe number of the subframe scheduled by using the single-subframe scheduling signaling.

1107. The user equipment performs calculation to obtain a second HARQ process according to a second HARQ process number field in the multi-subframe scheduling signaling.

1108. The user equipment performs calculation to obtain a second transport block in the second HARQ process according to the subframe number of the subframe scheduled by using the multi-subframe scheduling signaling.

It should be noted that step 1105 and step 1106, and step 1107 and step 1108 are not performed in a sequential order, and generally, step 1105 and step 1106, and step 1107 and step 1108 may be performed simultaneously. In this embodiment of the present invention, an order in which step 1105 and step 1106, and step 1107 and step 1108 are performed is not limited herein, in a specific implementation environment, a method for distinguishing an order in which step 1105 and step 1106, and step 1107 and step 1108 are performed is the same as a method for distinguishing an order in which step 1101 and step 1102 are performed, and details are not described herein again.

1109. The user equipment processes a data packet in the first transport block.

1110. The user equipment receives data according to single-subframe scheduling signaling when the single-subframe scheduling signaling is received in the subframe scheduled by using the multi-subframe scheduling signaling.

1111. The user equipment receives, in a subframe after a last subframe scheduled by using the multi-subframe scheduling signaling, data that is scheduled by using the multi-subframe scheduling signaling and that is in the subframe in which the single-subframe scheduling signaling is received.

The multi-subframe scheduling signaling is used to schedule data to be newly transmitted.

The single-subframe scheduling signaling is used to schedule data to be retransmitted.

Figure 9:
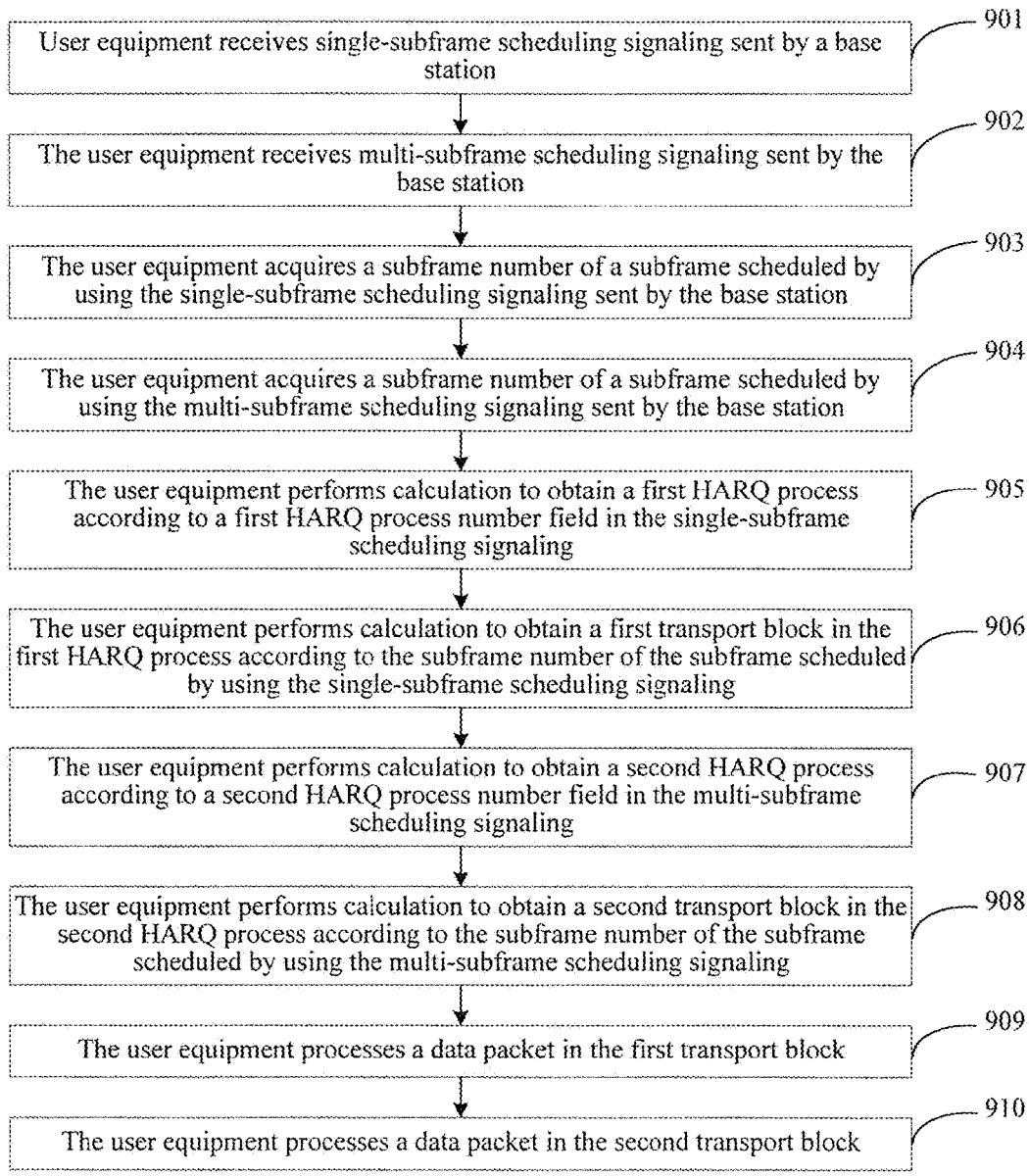
FIG. 9 is a schematic flowchart of a method for transmission by using scheduling signaling according to still another embodiment of the present invention.
Figure 10:
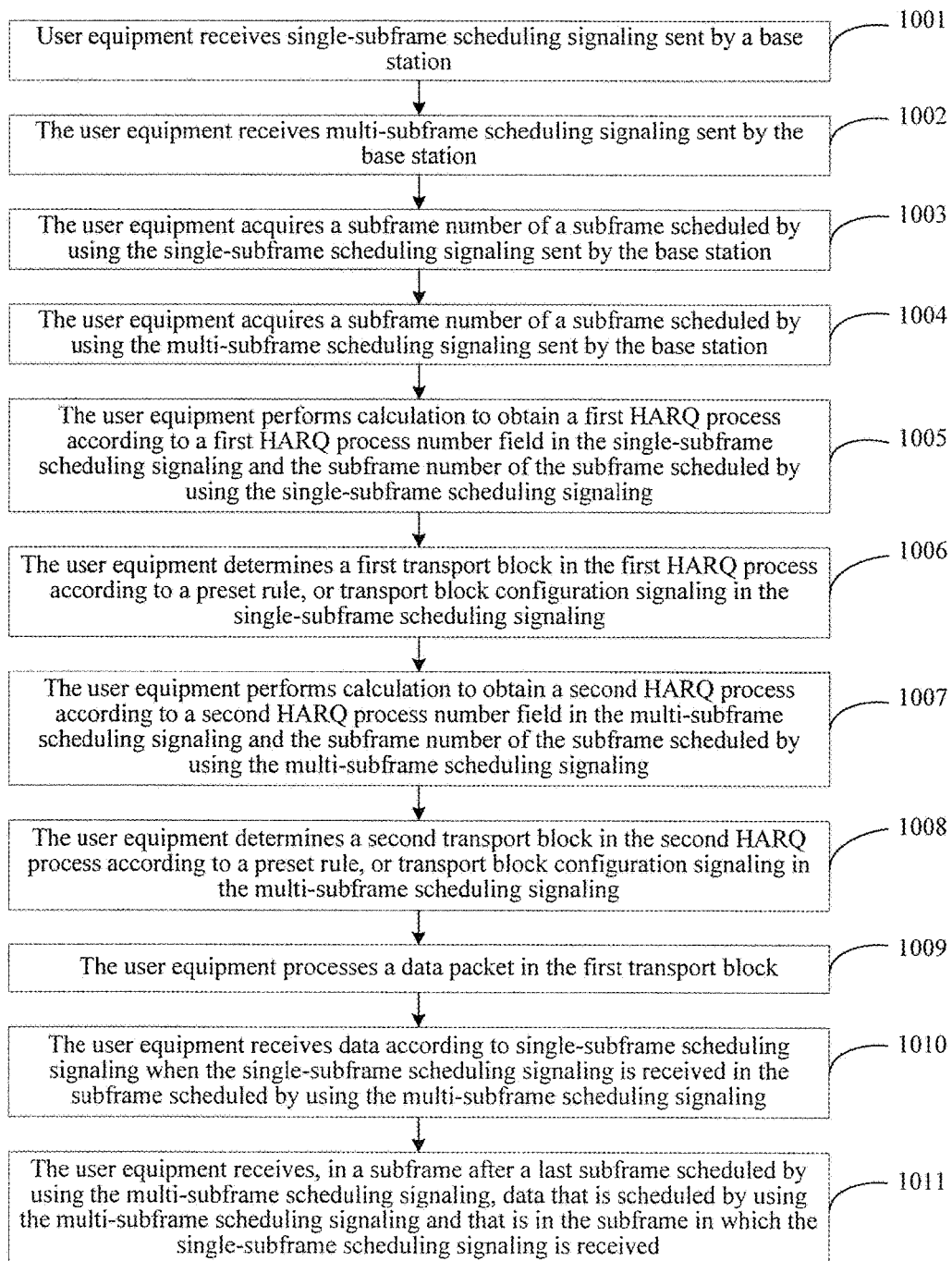
FIG. 10 is a schematic flowchart of another method for transmission by using scheduling signaling according to still another embodiment of the present invention.

It should be noted that, for descriptions of steps in this embodiment, refer to the detailed descriptions in the embodiments corresponding to FIG. 9 and FIG. 10 in the foregoing embodiments, and details are not described herein again.

According to the method for transmission by using scheduling signaling provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

Figure 12:
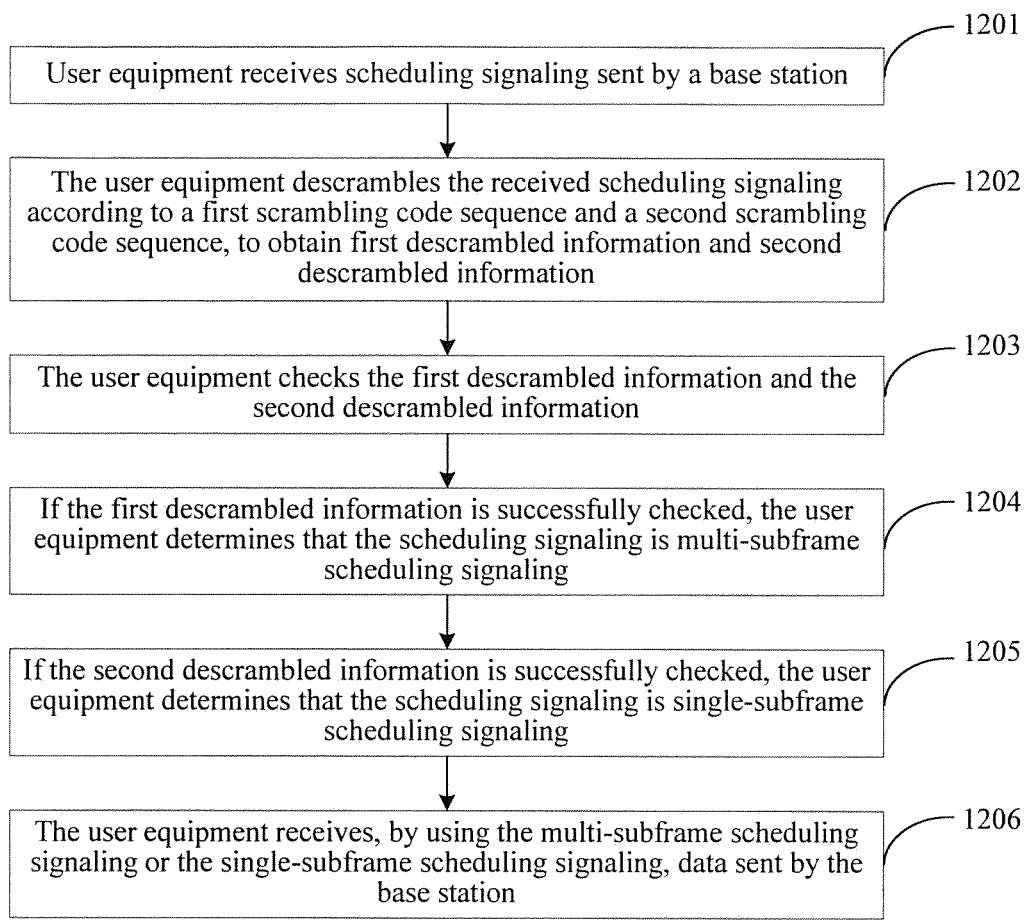
FIG. 12 is a schematic flowchart of yet another method for transmission by using scheduling signaling according to still another embodiment of the present invention.

An embodiment of the present invention provides a method for transmission by using scheduling signaling. Referring to FIG. 12, the method includes the following steps:

1201. User equipment UE receives scheduling signaling sent by a base station.

1202. The user equipment descrambles the received scheduling signaling according to a first scrambling code sequence and a second scrambling code sequence, to obtain first descrambled information and second descrambled information.

The first scrambling code sequence and the second scrambling code sequence are preset by the UE or configured for the UE by the base station.

The first scrambling code sequence may be a first radio network temporary identifier (RNTI), and the first RNTI is dedicated for multi-subframe scheduling signaling. The second scrambling code sequence may be a second RNTI, and the second RNTI is dedicated for single-subframe scheduling signaling.

1203. The user equipment checks the first descrambled information and the second descrambled information.

The first descrambled information is a descrambled sequence obtained after data that is scrambled on a base station side by using a first RNTI is descrambled. The second descrambled information is a descrambled sequence obtained after data that is scrambled on a base station side by using a second RNTI is descrambled.

1204. If the first descrambled information is successfully checked, the user equipment determines that the scheduling signaling is multi-subframe scheduling signaling.

1205. If the second descrambled information is successfully checked, the user equipment determines that the scheduling signaling is single-subframe scheduling signaling.

1206. The user equipment receives, by using the multi-subframe scheduling signaling or the single-subframe scheduling signaling, data sent by the base station.

It should be noted that step 1204 and step 1205 are not performed in a sequential order, and generally, step 1204 and step 1205 may be performed simultaneously. In this embodiment of the present invention, an order in which step 1204 and step 1205 are performed is not limited herein.

The scrambling code sequence of the scheduling signaling may be sent to the UE by the base station, or may be preset by the UE.

When lengths of single-subframe scheduling signaling and multi-subframe scheduling signaling are the same, the UE cannot distinguish whether the scheduling signaling is single-subframe scheduling signaling or multi-subframe scheduling signaling. In this case, the method provided in this embodiment may be used to distinguish, by using different scrambling codes, whether the scheduling signaling is single-subframe scheduling signaling or multi-subframe scheduling signaling.

According to the method for transmission by using scheduling signaling provided in this embodiment of the present invention, on a user equipment side, received scheduling signaling is descrambled, and checking is performed to determine whether the scheduling signaling is multi-subframe scheduling signaling or single-subframe scheduling signaling, which resolves a problem that user equipment cannot autonomously determine whether scheduling signaling is multi-subframe scheduling signaling or single-subframe scheduling signaling, reduces an operation procedure, and improves working efficiency.

Figure 13:
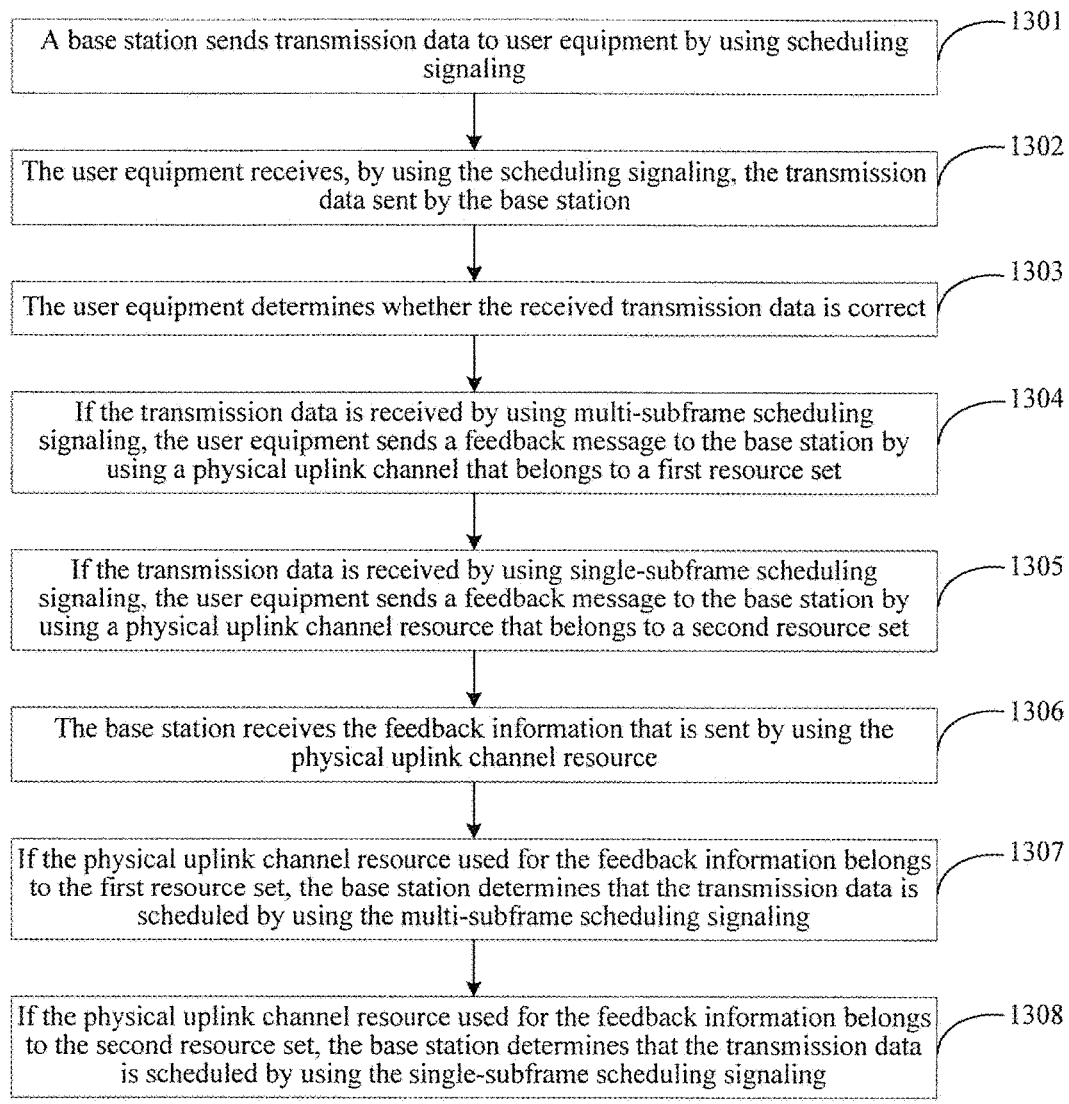
FIG. 13 is a schematic flowchart of a method for transmission by using scheduling signaling according to yet another embodiment of the present invention.

An embodiment of the present invention provides a method for transmission by using scheduling signaling. Referring to FIG. 13, the method includes the following steps:

1301. A base station sends transmission data to UE by using scheduling signaling.

Specifically, the base station sends transmission data to the user equipment in a subframe scheduled by using the scheduling signaling.

1302. The user equipment UE receives, by using the scheduling signaling, the transmission data sent by the base station.

After receiving the scheduling signaling sent by the base station, the UE receives, according to the scheduling signaling, data that is transmitted by the base station in a subframe scheduled by using the scheduling signaling.

The scheduling signaling includes single-subframe scheduling signaling or multi-subframe scheduling signaling.

1303. The user equipment determines whether the received transmission data is correct.

1304. If the transmission data is received by using multi-subframe scheduling signaling, the user equipment sends a feedback message to the base station by using a physical uplink channel that belongs to a first resource set.

The feedback message is obtained according to a determining result, and the feedback information includes: an acknowledgement character ACK or a negative acknowledgement character NACK.

If the user equipment determines that the received transmission data is correct, the user equipment sends an ACK to the base station, or if the user equipment determines that the received transmission data is incorrect, the user equipment sends an NACK to the base station.

1305. If the transmission data is received by using single-subframe scheduling signaling, the user equipment sends a feedback message to the base station by using a physical uplink channel resource that belongs to a second resource set.

1306. The base station receives the feedback information that is sent by the UE by using the physical uplink channel.

The first resource set is different from the second resource set.

That the first resource set is different from the second resource set may include: time-frequency resource numbers, orthogonal sequence numbers, and/or cyclic shift locations of physical uplink channel resources in the first resource set and the second resource set are different.

Specifically, the physical uplink channel includes a physical uplink control channel (PUCCH), a physical uplink shared channel (PUSCH), or the like.

1307. If the physical uplink channel resource used for the feedback information belongs to the first resource set, the base station determines that the transmission data is scheduled by using the multi-subframe scheduling signaling.

The first resource set is configured by using higher layer signaling or is predefined.

1308. If the physical uplink channel resource used for the feedback information belongs to the second resource set, the base station determines that the transmission data is scheduled by using the single-subframe scheduling signaling.

The second resource set is configured by using higher layer signaling or is predefined.

Each of the first resource set and the second resource set includes at least one physical uplink channel resource. The physical uplink channel resource may be a resource used for sending a physical uplink control channel. A factor for determining a physical uplink channel resource is one or any combination of the following items: a time-frequency resource number, an orthogonal sequence number, and a cyclic shift location, where different time-frequency resource numbers, orthogonal sequence numbers, and cyclic shift locations correspond to different physical uplink channel resources.

It should be noted that step 1307 and step 1308 are not performed in a sequential order, and generally may be performed simultaneously. In this embodiment of the present invention, an order in which step 1307 and step 1308 are performed is not limited herein.

Specifically, a PUCCH resource used for an ACK/NACK corresponding to transmission data in a subframe scheduled by using multi-subframe scheduling signaling is different from a PUCCH resource used for an ACK/NACK corresponding to transmission data in a subframe scheduled by using single-subframe scheduling signaling. In this way, the base station can determine, according to a resource location in which a received PUCCH is located, whether transmission data corresponding to an ACK/NACK is in a subframe scheduled by using multi-subframe scheduling signaling or in a subframe scheduled by using single-subframe scheduling signaling. A PUCCH resource used for an ACK/NACK corresponding to transmission data in a subframe scheduled by using multi-subframe scheduling signaling belongs to a first resource set, and a PUCCH resource used for an ACK/NACK corresponding to transmission data in a subframe scheduled by using single-subframe scheduling signaling belongs to a second resource set.

According to the method for transmission by using scheduling signaling provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Figure 14:
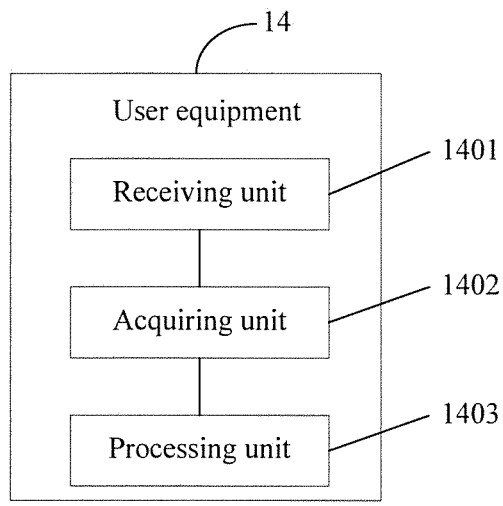
FIG. 14 is a schematic structural diagram of user equipment according to an embodiment of the present invention.

An embodiment of the present invention provides user equipment 14, which is used to implement the method for transmission by using scheduling signaling provided in a method embodiment corresponding to any one of FIG. 1 and FIG. 5 to FIG. 11. Referring to FIG. 14, the user equipment includes: a receiving unit 1401, an acquiring unit 1402, and a processing unit 1403.

The receiving unit 1401 is configured to receive scheduling signaling sent by a base station.

The scheduling signaling may include a HARQ process number field.

The acquiring unit 1402 is configured to acquire a subframe number of a subframe scheduled by using the scheduling signaling sent by the base station.

The acquiring unit 1402 is further configured to determine a transport block according to the HARQ process number field received by the receiving unit 1401, and the subframe number.

The processing unit 1403 is configured to process data in the transport block.

According to the user equipment provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads.

Figure 15:
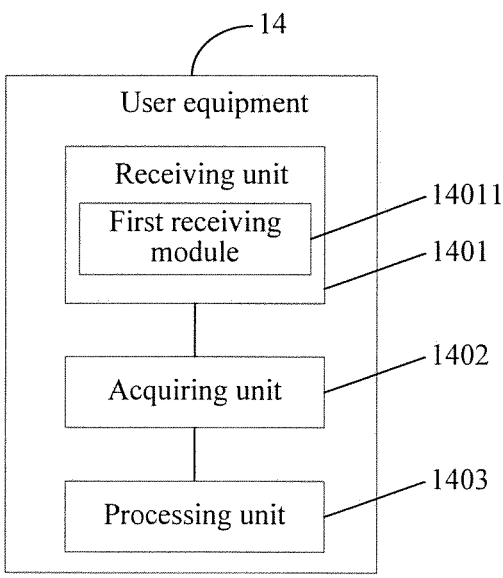
FIG. 15 is a schematic structural diagram of another user equipment according to an embodiment of the present invention.

Specifically, when the scheduling signaling is single-subframe scheduling signaling, referring to FIG. 15, the receiving unit 1401 includes a first receiving module 14011.

The first receiving module 14011 is configured to receive the single-subframe scheduling signaling sent by the base station.

The single-subframe scheduling signaling may include a first HARQ process number field.

Figure 16:
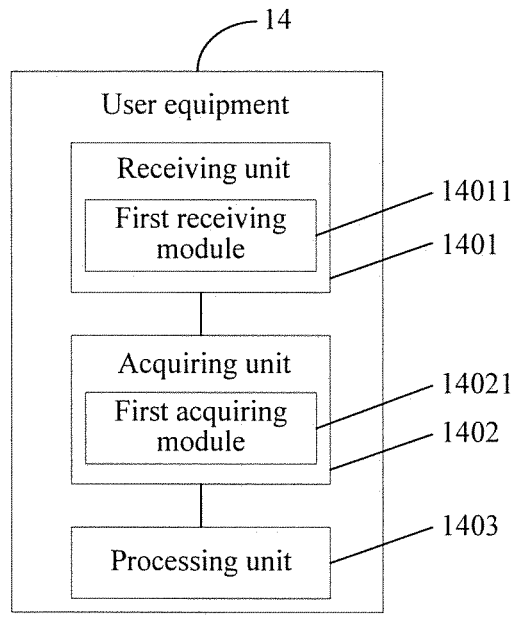
FIG. 16 is a schematic structural diagram of still another user equipment according to an embodiment of the present invention.

Further, referring to FIG. 16, the acquiring unit includes a first acquiring module 14021.

The first acquiring module 14021 is configured to acquire the subframe number of the subframe scheduled by using the single-subframe scheduling signaling sent by the base station.

The first acquiring module 14021 is further configured to perform calculation to obtain a first HARQ process according to the first HARQ process number field in the single-subframe scheduling signaling received by the first receiving module 14011, and the subframe number of the subframe scheduled by using the single-subframe scheduling signaling.

The first acquiring module 14021 is further configured to determine a first transport block in the first HARQ process according to a preset rule, or transport block configuration signaling in the single-subframe scheduling signaling.

The preset rule is a correspondence between a HARQ process and a transport block.

Figure 17:
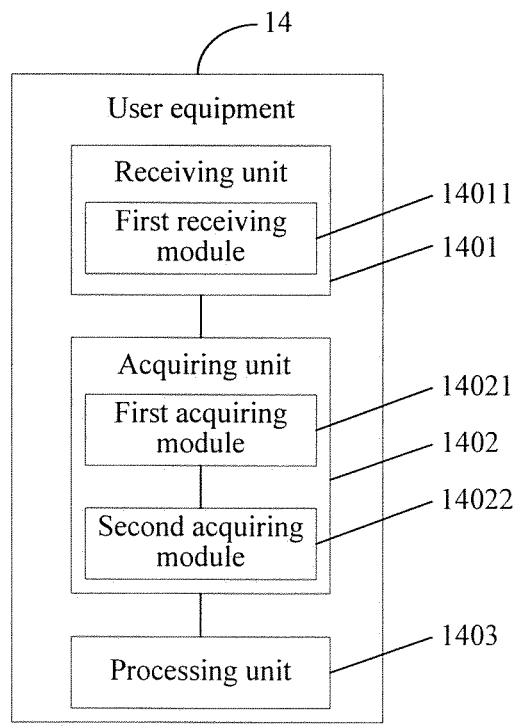
FIG. 17 is a schematic structural diagram of yet another user equipment according to an embodiment of the present invention.

Optionally, referring to FIG. 17, the acquiring unit further includes a second acquiring module 14022.

The second acquiring module 14022 is configured to perform calculation to obtain a first HARQ process according to the first HARQ process number field in the single-subframe scheduling signaling received by the first receiving module 14011.

The second acquiring module 14022 is further configured to perform calculation to obtain a first transport block in the first HARQ process according to the subframe number of the subframe scheduled by using the single-subframe scheduling signaling.

Figure 18:
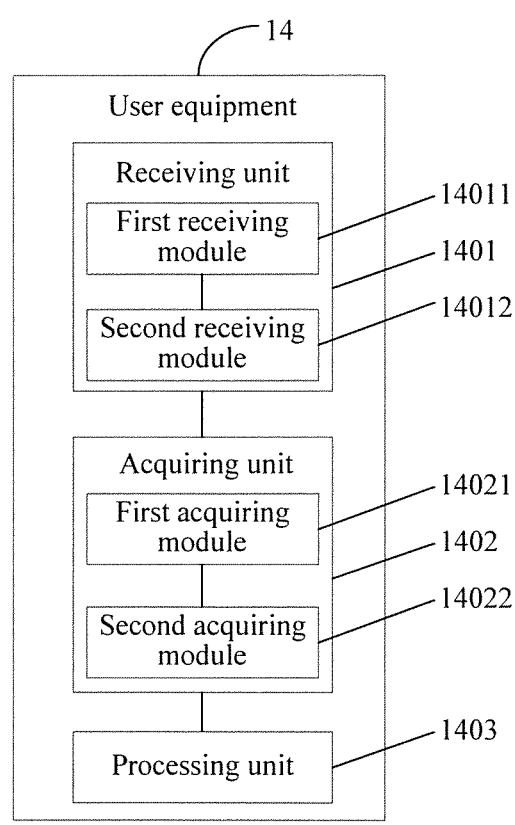
FIG. 18 is a schematic structural diagram of user equipment according to another embodiment of the present invention.

Specifically, optionally, when the scheduling signaling is multi-subframe scheduling signaling, referring to FIG. 18, the receiving unit 1401 further includes a second receiving module 14012.

The second receiving module 14012 is configured to receive the multi-subframe scheduling signaling sent by the base station.

Figure 19:
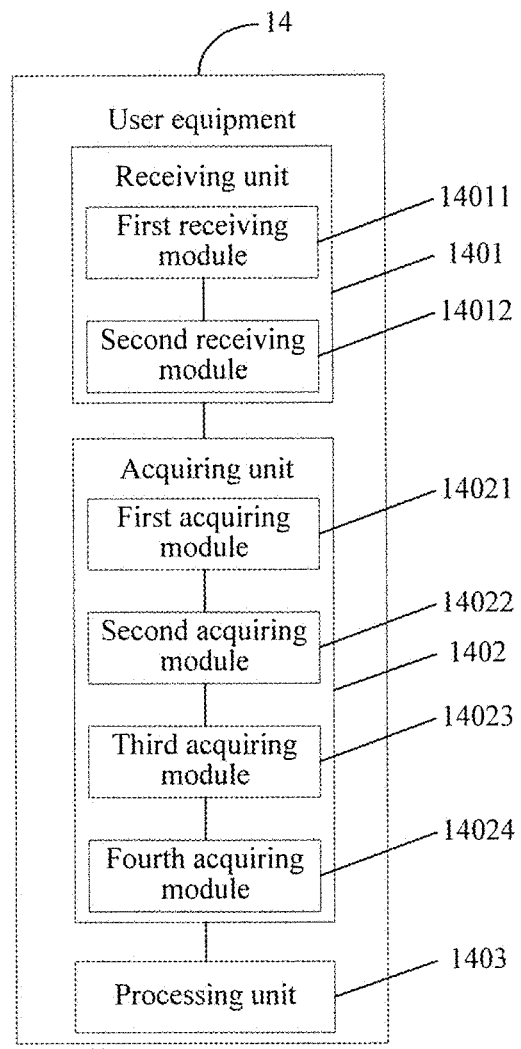
FIG. 19 is a schematic structural diagram of another user equipment according to another embodiment of the present invention.

Referring to FIG. 19, the acquiring unit 1402 further includes a third acquiring module 14023 and a fourth acquiring module 14024.

The third acquiring module 14023 is configured to acquire the subframe number of the subframe scheduled by using the multi-subframe scheduling signaling sent by the base station.

The third acquiring module 14023 is configured to perform calculation to obtain a second HARQ process according to the second HARQ process number field in the multi-subframe scheduling signaling received by the second receiving module 14012, and the subframe number of the subframe scheduled by using the multi-subframe scheduling signaling.

The third acquiring module 14023 is further configured to determine a second transport block in the second HARQ process according to a preset rule, or transport block configuration signaling in the multi-subframe scheduling signaling.

The fourth acquiring module 14024 is configured to perform calculation to obtain a second HARQ process according to the second HARQ process number field in the multi-subframe scheduling signaling received by the second receiving module 14012.

The fourth acquiring module 14024 is further configured to perform calculation to obtain a second transport block in the second HARQ process according to the subframe number of the subframe scheduled by using the multi-subframe scheduling signaling.

The second transport block corresponds to the second HARQ process.

Further, optionally, the receiving unit 1401 is further configured to receive data according to single-subframe scheduling signaling when the single-subframe scheduling signaling is received in a subframe scheduled by using multi-subframe scheduling signaling.

Specifically, the processing unit 1403 is further configured to receive, in a subframe after a last subframe scheduled by using the multi-subframe scheduling signaling, data that is scheduled by using the multi-subframe scheduling signaling and that is in the subframe in which the single-subframe scheduling signaling is received.

The multi-subframe scheduling signaling is used to schedule data to be newly transmitted.

The single-subframe scheduling signaling is used to schedule data to be retransmitted.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

The multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling, that is, when the subframe scheduled by using the single-subframe scheduling signaling and the subframe scheduled by using the multi-subframe scheduling signaling are a same subframe, the user equipment determines a transport block according to the HARQ process number field in the single-subframe scheduling signaling and the subframe number of the subframe scheduled by using the single-subframe scheduling signaling.

It should be noted that, for an implementation manner and an interaction process of the units in the user equipment in this embodiment, reference may be made to related descriptions in a corresponding method embodiment.

According to the user equipment provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

Figure 20:
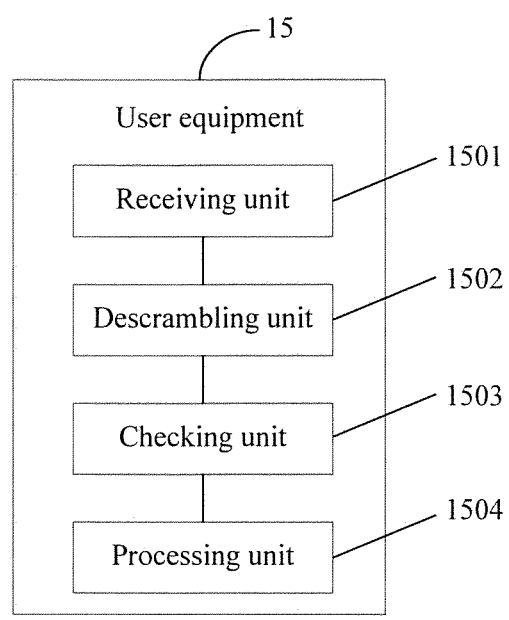
FIG. 20 is a schematic structural diagram of still another user equipment according to another embodiment of the present invention.

An embodiment of the present invention provides user equipment 15, which is used to implement the method for transmission by using scheduling signaling provided in the method embodiments corresponding to FIG. 2 and FIG. 12. Referring to FIG. 20, the user equipment includes: a receiving unit 1501, a descrambling unit 1502, a checking unit 1503, and a processing unit 1504.

The receiving unit 1501 is configured to receive scheduling signaling sent by a base station.

The descrambling unit 1502 is configured to descramble, according to a first scrambling code sequence and a second scrambling code sequence, the scheduling signaling received by the receiving unit 1501, to obtain first descrambled information and second descrambled information.

The first scrambling code sequence and the second scrambling code sequence are preset by the UE or configured for the UE by the base station.

The first scrambling code sequence may be a first radio network temporary identifier (RNTI), and the first RNTI is dedicated for multi-subframe scheduling signaling. The second scrambling code sequence may be a second RNTI, and the second RNTI is dedicated for single-subframe scheduling signaling.

The checking unit 1503 is configured to check the first descrambled information and the second descrambled information.

The first descrambled information is a descrambled sequence obtained after data that is scrambled on a base station side by using a first RNTI is descrambled. The second descrambled information is a descrambled sequence obtained after data that is scrambled on a base station side by using a second RNTI is descrambled.

The processing unit 1504 is configured to determine, according to a check result obtained by the checking unit 1503, whether the scheduling signaling is multi-subframe scheduling signaling or single-subframe scheduling signaling.

The receiving unit 1501 is further configured to receive, by using the scheduling signaling, data sent by the base station.

Figure 21:
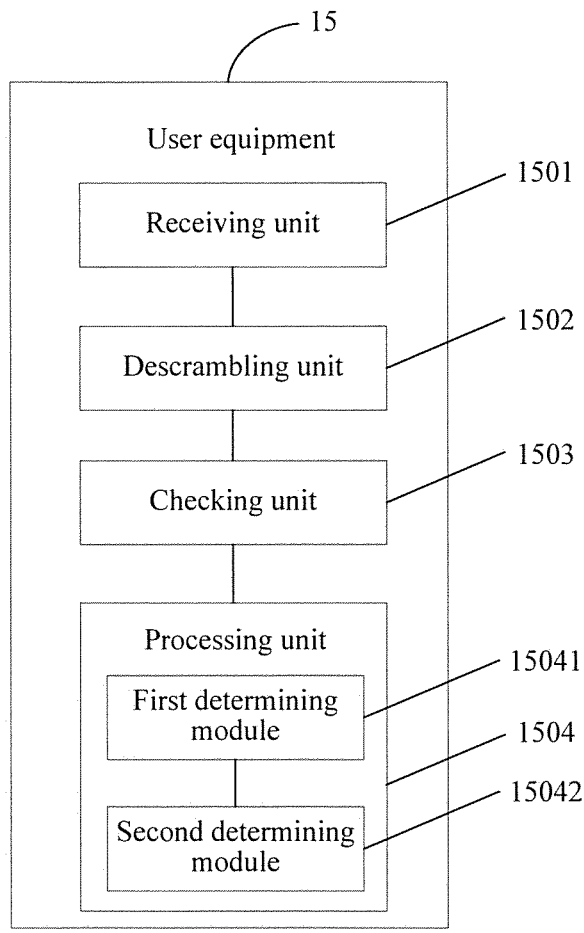
FIG. 21 is a schematic structural diagram of yet another user equipment according to another embodiment of the present invention.

Further, referring to FIG. 21, the processing unit 1504 includes: a first determining module 15041 and a second determining module 15042.

The first determining module 15041 is configured to: if the first descrambled information is successfully checked, determine that the scheduling signaling is multi-subframe scheduling signaling.

The second determining module 15042 is configured to: if the second descrambled information is successfully checked, determine that the scheduling signaling is single-subframe scheduling signaling.

A scrambling code of the scheduling signaling may be sent to the UE by the base station, or may be preset by the UE.

When lengths of single-subframe scheduling signaling and multi-subframe scheduling signaling are the same, the UE cannot distinguish whether the scheduling signaling is single-subframe scheduling signaling or multi-subframe scheduling signaling. In this case, the method provided in this embodiment may be used to distinguish, by using different scrambling codes, whether the scheduling signaling is single-subframe scheduling signaling or multi-subframe scheduling signaling.

Specifically, the user equipment can determine, according to a scrambling code of the scheduling signaling for received data, whether the received data is scheduled by using single-subframe scheduling signaling or multi-subframe scheduling signaling, and does not need to rely on the base station to determine a type of the scheduling signaling, which is more convenient in a specific operation process.

It should be noted that, for an implementation manner and an interaction process of the units in the user equipment in this embodiment, reference may be made to related descriptions in a corresponding method embodiment.

According to the user equipment provided in this embodiment of the present invention, on a user equipment side, received scheduling signaling is descrambled, and checking is performed to determine whether the scheduling signaling is multi-subframe scheduling signaling or single-subframe scheduling signaling, which resolves a problem that user equipment cannot autonomously determine whether scheduling signaling is multi-subframe scheduling signaling or single-subframe scheduling signaling, reduces an operation procedure, and improves working efficiency.

Figure 22:
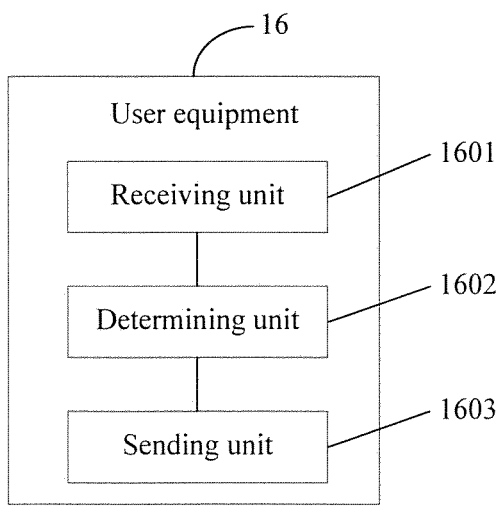
FIG. 22 is a schematic structural diagram of user equipment according to still another embodiment of the present invention.

An embodiment of the present invention provides user equipment 16, which is used to implement the method for transmission by using scheduling signaling provided in the method embodiments corresponding to FIG. 3 and FIG. 13. Referring to FIG. 22, the user equipment includes: a receiving unit 1601, a determining unit 1602, and a sending unit 1603.

The receiving unit 1601 is configured to receive, by using scheduling signaling, transmission data sent by a base station.

The scheduling signaling includes single-subframe scheduling signaling or multi-subframe scheduling signaling.

The determining unit 1602 is configured to determine whether the transmission data received by the receiving unit 1601 is correct.

The sending unit 1603 is configured to: if the transmission data is received by using multi-subframe scheduling signaling, send a feedback message to the base station by using a physical uplink channel resource that belongs to a first resource set.

The feedback message is obtained according to a determining result, and the feedback information includes: an acknowledgement character ACK or a negative acknowledgement character NACK.

If the user equipment determines that the received transmission data is correct, the user equipment sends an ACK to the base station, or if the user equipment determines that the received transmission data is incorrect, the user equipment sends an NACK to the base station.

The sending unit 1603 is further configured to: if the transmission data is received by using single-subframe scheduling signaling, send a feedback message to the base station by using a physical uplink channel resource that belongs to a second resource set.

It should be noted that, for an implementation manner and an interaction process of the units in the user equipment in this embodiment, reference may be made to related descriptions in a corresponding method embodiment.

According to the user equipment provided in this embodiment of the present invention, different physical uplink channels are used to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Figure 23:
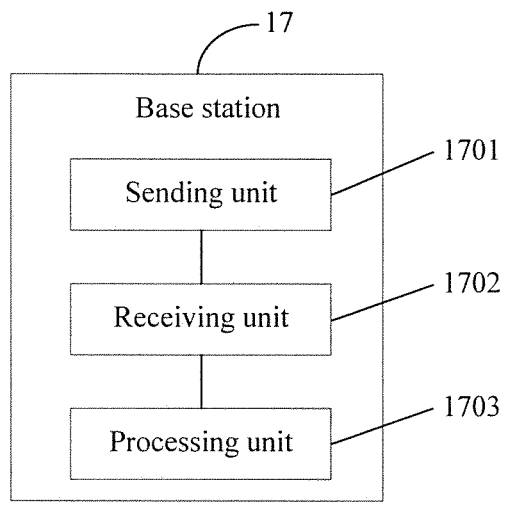
FIG. 23 is a schematic structural diagram of a base station according to an embodiment of the present invention.

An embodiment of the present invention provides a base station 17, which is used to implement the method for transmission by using scheduling signaling provided in the method embodiment corresponding to FIG. 4. Referring to FIG. 23, the base station includes: a sending unit 1701, a receiving unit 1702, and a processing unit 1703.

The sending unit 1701 is configured to send transmission data to UE by using scheduling signaling.

The receiving unit 1702 is configured to receive feedback information that is sent by the UE by using a physical uplink channel resource.

The feedback information is determined by the UE according to a status of receiving the transmission data, and the feedback information includes: an acknowledgment character ACK or a negative acknowledgment character NACK.

The processing unit 1703 is configured to determine, according to the physical uplink channel used for the feedback information received by the receiving unit 1702, whether the transmission data is scheduled by using multi-subframe scheduling signaling or scheduled by using single-subframe scheduling signaling.

Figure 24:
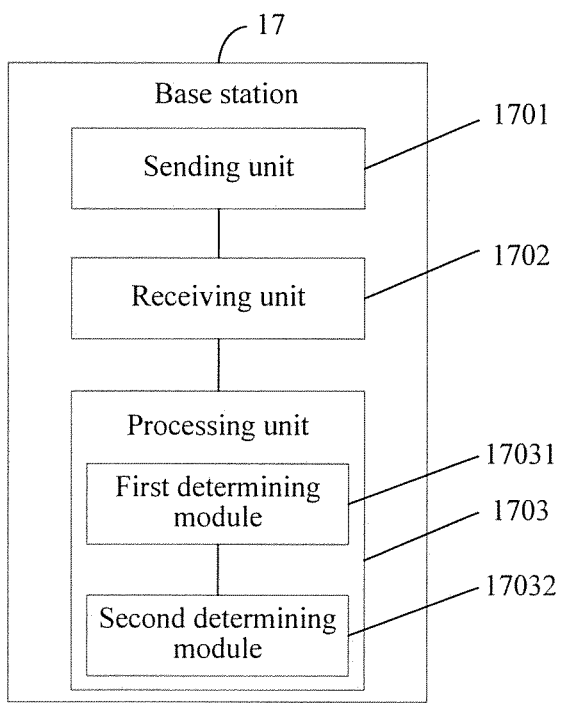
FIG. 24 is a schematic structural diagram of another base station according to an embodiment of the present invention.

Specifically, referring to FIG. 24, the processing unit 1703 includes: a first determining module 17031 and a second determining module 17032.

The first determining module 17031 is configured to: if the physical uplink channel resource used for the feedback information received by the receiving unit 1702 belongs to a first resource set, determine that the transmission data is scheduled by using multi-subframe scheduling signaling.

The first resource set is configured by using higher layer signaling or is predefined.

The second determining module 17032 is configured to: if the physical uplink channel resource used for the feedback information received by the receiving unit 1702 belongs to a second resource set, determine that the transmission data is scheduled by using single-subframe scheduling signaling.

The second resource set is configured by using higher layer signaling or is predefined.

The first resource set is different from the second resource set.

That the first resource set is different from the second resource set may include: time-frequency resource numbers, orthogonal sequence numbers, and/or cyclic shift locations of physical uplink channel resources in the first resource set and the second resource set are different.

The physical uplink channel includes a physical uplink control channel PUCCH, a physical uplink shared channel PUSCH, or the like.

Specifically, a PUCCH resource used for an ACK/NACK corresponding to transmission data in a subframe scheduled by using multi-subframe scheduling signaling is different from a PUCCH resource used for an ACK/NACK corresponding to transmission data in a subframe scheduled by using single-subframe scheduling signaling. In this way, the base station can determine, according to a resource location in which a received PUCCH is located, whether transmission data corresponding to an ACK/NACK is in a subframe scheduled by using multi-subframe scheduling signaling or in a subframe scheduled by using single-subframe scheduling signaling. A PUCCH resource used for an ACK/NACK corresponding to transmission data in a subframe scheduled by using multi-subframe scheduling signaling belongs to a first resource set, and a PUCCH resource used for an ACK/NACK corresponding to transmission data in a subframe scheduled by using single-subframe scheduling signaling belongs to a second resource set.

It should be noted that, for an implementation manner and an interaction process of the units in the base station in this embodiment, reference may be made to related descriptions in a corresponding method embodiment.

According to the base station provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

It should be noted that the apparatus embodiments of the user equipment 16 and the base station 17 in the present invention are combined together and used to implement the method for transmission by using scheduling signaling provided in the method embodiment corresponding to FIG. 13.

Figure 25:
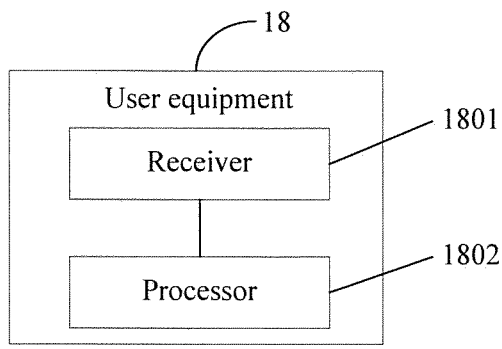
FIG. 25 is a schematic structural diagram of another user equipment according to still another embodiment of the present invention.

An embodiment of the present invention provides user equipment 18, which is used to implement the method for transmission by using scheduling signaling provided in the method embodiment corresponding to any one of FIG. 1 and FIG. 5 to FIG. 11. Referring to FIG. 25, the user equipment includes: a receiver 1801 and a processor 1802.

The receiver 1801 is configured to receive scheduling signaling sent by a base station.

The scheduling signaling may include a HARQ process number field.

The processor 1802 is configured to acquire a subframe number of a subframe scheduled by using the scheduling signaling.

The processor 1802 is further configured to determine a transport block according to the HARQ process number field received by the receiver 1801, and the subframe number acquired by the processor 1802.

The processor 1802 is further configured to process data in the transport block.

According to the user equipment provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads.

Further, the scheduling signaling is single-subframe scheduling signaling, the HARQ process number field is a first HARQ process number field, and the processor 1802 is specifically configured to perform the following operations:

perform calculation to obtain a first HARQ process according to the first HARQ process number field in the single-subframe scheduling signaling and the subframe number of the subframe scheduled by using the single-subframe scheduling signaling; and determine a first transport block in the first HARQ process according to a preset rule, or transport block configuration signaling in the single-subframe scheduling signaling.

The preset rule is a correspondence between a HARQ process and a transport block.

Optionally, further, the scheduling signaling is single-subframe scheduling signaling, the HARQ process number field is a first HARQ process number field, and the processor 1802 is further specifically configured to perform the following operations:

perform calculation to obtain a first HARQ process according to the first HARQ process number field in the single-subframe scheduling signaling; and perform calculation to obtain a first transport block in the first HARQ process according to the subframe number of the subframe scheduled by using the single-subframe scheduling signaling.

Optionally, the scheduling signaling is multi-subframe scheduling signaling, the HARQ process number field is a second HARQ process number field, and the processor 1802 is further specifically configured to perform the following operations:

perform calculation to obtain a second HARQ process according to the second HARQ process number field in the multi-subframe scheduling signaling and the subframe number of the subframe scheduled by using the multi-subframe scheduling signaling; and determine a second transport block in the second HARQ process according to a preset rule, or transport block configuration signaling in the multi-subframe scheduling signaling.

Optionally, the scheduling signaling is multi-subframe scheduling signaling, the HARQ process number field is a second HARQ process number field, and the processor 1802 is further specifically configured to perform the following operations:

perform calculation to obtain a second HARQ process according to the second HARQ process number field in the multi-subframe scheduling signaling; and perform calculation to obtain a second transport block in the second HARQ process according to the subframe number of the subframe scheduled by using the multi-subframe scheduling signaling.

Further, the receiver 1801 is further configured to receive data according to single-subframe scheduling signaling when the single-subframe scheduling signaling is received in a subframe scheduled by using multi-subframe scheduling signaling; and the receiver 1801 is further configured to receive, in a subframe after a last subframe scheduled by using the multi-subframe scheduling signaling, data that is scheduled by using the multi-subframe scheduling signaling and that is in the subframe in which the single-subframe scheduling signaling is received.

The multi-subframe scheduling signaling is used to schedule data to be newly transmitted.

The single-subframe scheduling signaling is used to schedule data to be retransmitted.

Specifically, the single-subframe scheduling signaling refers to scheduling signaling used to notify scheduling information of one subframe, where a scheduled subframe may be a subframe in which the single-subframe scheduling signaling is sent or a subframe after a subframe in which the single-subframe scheduling signaling is sent.

The multi-subframe scheduling signaling refers to scheduling signaling used to notify scheduling information of at least two subframes, where a scheduled subframe may be a subframe in which the multi-subframe scheduling signaling is sent and at least one subsequent subframe, or at least two subframes after a subframe in which the multi-subframe scheduling signaling is sent.

A scheduling priority of the single-subframe scheduling signaling is higher than a scheduling priority of the multi-subframe scheduling signaling, that is, when the subframe scheduled by using the single-subframe scheduling signaling and the subframe scheduled by using the multi-subframe scheduling signaling are a same subframe, the user equipment determines a transport block according to the HARQ process number field in the single-subframe scheduling signaling and the subframe number of the subframe scheduled by using the single-subframe scheduling signaling.

It should be noted that, for an implementation manner and an interaction process of the receiver and the processor in the user equipment in this embodiment, reference may be made to related descriptions in a corresponding method embodiment.

According to the user equipment provided in this embodiment of the present invention, a transport block is determined according to a HARQ process number field in scheduling signaling and a subframe number of a subframe scheduled by using the scheduling signaling, which can avoid a problem of insufficient processes, increase a quantity of processes that can be supported by scheduling signaling, and increase HARQ processes or transport blocks in a HARQ process that can be used in single-subframe scheduling or multi-subframe scheduling, without increasing scheduling signaling overheads. Further, flexibility of data retransmission can be improved.

Figure 26:
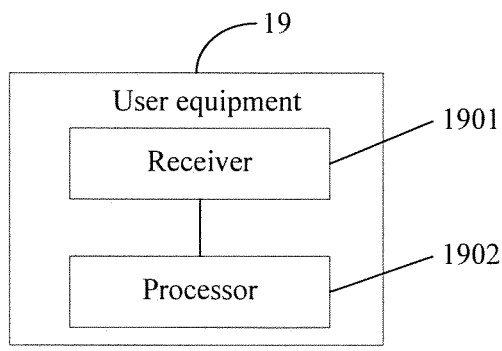
FIG. 26 is a schematic structural diagram of still another user equipment according to still another embodiment of the present invention.

An embodiment of the present invention provides user equipment 19, which is used to implement the method for transmission by using scheduling signaling provided in the method embodiment corresponding to FIG. 2. Referring to FIG. 26, the user equipment includes: a receiver 1901 and a processor 1902.

The receiver 1901 is configured to receive scheduling signaling sent by a base station.

The processor 1902 is configured to descramble, according to a first scrambling code sequence and a second scrambling code sequence, the scheduling signaling received by the receiver 1901, to obtain first descrambled information and second descrambled information.

The processor 1902 is further configured to check the first descrambled information and the second descrambled information that are obtained by the processor 1902.

The processor 1902 is further configured to determine, according to a check result obtained by the processor 1902, whether the scheduling signaling is multi-subframe scheduling signaling or single-subframe scheduling signaling.

The receiver 1901 is further configured to receive, by using the scheduling signaling obtained by the processor 1902, data sent by the base station.

According to the user equipment provided in this embodiment of the present invention, on a user equipment side, received scheduling signaling is descrambled, and checking is performed to determine whether the scheduling signaling is multi-subframe scheduling signaling or single-subframe scheduling signaling, which resolves a problem that user equipment cannot autonomously determine whether scheduling signaling is multi-subframe scheduling signaling or single-subframe scheduling signaling, reduces an operation procedure, and improves working efficiency.

Further, the user equipment is used to implement the method for transmission by using scheduling signaling provided in the method embodiment corresponding to FIG. 12, and the processor 1902 is further configured to: if the first descrambled information is successfully checked, determine that the scheduling signaling is multi-subframe scheduling signaling.

Further, the processor 1902 is further configured to: if the second descrambled information is successfully checked, determine that the scheduling signaling is single-subframe scheduling signaling.

The first scrambling code sequence and the second scrambling code sequence are preset by the UE or configured for the UE by the base station.

The first scrambling code sequence may be a first radio network temporary identifier (RNTI), and the first RNTI is dedicated for multi-subframe scheduling signaling. The second scrambling code sequence may be a second RNTI, and the second RNTI is dedicated for single-subframe scheduling signaling.

When lengths of single-subframe scheduling signaling and multi-subframe scheduling signaling are the same, the UE cannot distinguish whether the scheduling signaling is single-subframe scheduling signaling or multi-subframe scheduling signaling. In this case, the method provided in this embodiment may be used to distinguish, by using different scrambling codes, whether the scheduling signaling is single-subframe scheduling signaling or multi-subframe scheduling signaling.

Specifically, the user equipment can determine, according to a scrambling code of the scheduling signaling for received data, whether the received data is scheduled by using single-subframe scheduling signaling or multi-subframe scheduling signaling, and does not need to rely on the base station to determine a type of the scheduling signaling, which is more convenient in a specific operation process.

It should be noted that, for an implementation manner and an interaction process of the receiver and the processor in the user equipment in this embodiment, reference may be made to related descriptions in a corresponding method embodiment.

According to the user equipment provided in this embodiment of the present invention, on a user equipment side, received scheduling signaling is descrambled, and checking is performed to determine whether the scheduling signaling is multi-subframe scheduling signaling or single-subframe scheduling signaling, which resolves a problem that user equipment cannot autonomously determine whether scheduling signaling is multi-subframe scheduling signaling or single-subframe scheduling signaling, reduces an operation procedure, and improves working efficiency.

Figure 27:
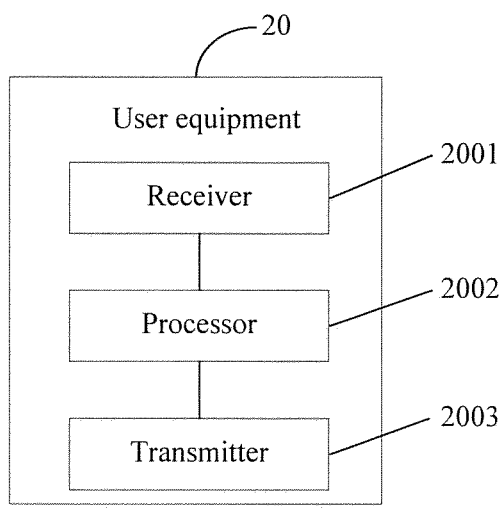
FIG. 27 is a schematic structural diagram of yet another user equipment according to still another embodiment of the present invention.

An embodiment of the present invention provides user equipment 20, which is used to implement the method for transmission by using scheduling signaling provided in the method embodiments corresponding to FIG. 3 and FIG. 13. Referring to FIG. 27, the user equipment includes: a receiver 2001, a processor 2002, and a transmitter 2003.

The receiver 2001 is configured to receive, by using scheduling signaling, transmission data sent by a base station.

The scheduling signaling includes single-subframe scheduling signaling or multi-subframe scheduling signaling.

The processor 2002 is configured to determine whether the transmission data received by the receiver 2001 is correct.

The transmitter 2003 is configured to: if the transmission data is received by using multi-subframe scheduling signaling, send a feedback message to the base station by using a physical uplink channel resource that belongs to a first resource set.

The feedback message is obtained according to a determining result, and the feedback information includes: an acknowledgement character ACK or a negative acknowledgement character NACK.

The transmitter 2003 is further configured to: if the transmission data is received by using single-subframe scheduling signaling, send a feedback message to the base station by using a physical uplink channel resource that belongs to a second resource set.

The first resource set is different from the second resource set.

That the first resource set is different from the second resource set may include: time-frequency resource numbers, orthogonal sequence numbers, and/or cyclic shift locations of physical uplink channel resources in the first resource set and the second resource set are different.

It should be noted that, for an implementation manner and an interaction process of the receiver, the processor, and the transmitter in the user equipment in this embodiment, reference may be made to related descriptions in a corresponding method embodiment.

According to the user equipment provided in this embodiment of the present invention, different physical uplink channels are used to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Figure 28:
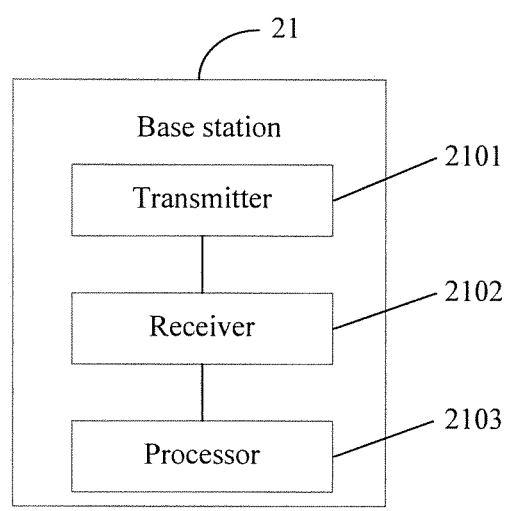
FIG. 28 is a schematic structural diagram of still another base station according to an embodiment of the present invention.

An embodiment of the present invention provides a base station 21, which is used to implement the method for transmission by using scheduling signaling provided in the method embodiment corresponding to FIG. 4. Referring to FIG. 28, the base station includes: a transmitter 2101, a receiver 2102, and a processor 2103.

The transmitter 2101 is configured to send transmission data to UE by using scheduling signaling.

The receiver 2102 is configured to receive feedback information that is sent by the UE by using a physical uplink channel resource.

The feedback information is determined by the UE according to a status of receiving the transmission data, and the feedback information includes: an acknowledgment character ACK or a negative acknowledgment character NACK.

The processor 2103 is further configured to determine, according to the physical uplink channel used for the feedback information received by the receiver 2102, whether the transmission data is scheduled by using multi-subframe scheduling signaling or scheduled by using single-subframe scheduling signaling.

According to the base station provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

Further, the processor 2103 is specifically configured to: if the physical uplink channel resource used for the feedback information belongs to a first resource set, determine that the transmission data is scheduled by using multi-subframe scheduling signaling.

The first resource set is configured by using higher layer signaling or is predefined.

Further, the processor 2103 is specifically configured to: if the physical uplink channel resource used for the feedback information belongs to a second resource set, determine that the transmission data is scheduled by using single-subframe scheduling signaling.

The second resource set is configured by using higher layer signaling or is predefined. The first resource set is different from the second resource set.

That the first resource set is different from the second resource set may include: time-frequency resource numbers, orthogonal sequence numbers, and/or cyclic shift locations of physical uplink channel resources in the first resource set and the second resource set are different.

The physical uplink channel includes a physical uplink control channel PUCCH, a physical uplink shared channel PUSCH, or the like.

Specifically, a PUCCH resource used for an ACK/NACK corresponding to transmission data in a subframe scheduled by using multi-subframe scheduling signaling is different from a PUCCH resource used for an ACK/NACK corresponding to transmission data in a subframe scheduled by using single-subframe scheduling signaling. In this way, the base station can determine, according to a resource location in which a received PUCCH is located, whether transmission data corresponding to an ACK/NACK is in a subframe scheduled by using multi-subframe scheduling signaling or in a subframe scheduled by using single-subframe scheduling signaling. A PUCCH resource used for an ACK/NACK corresponding to transmission data in a subframe scheduled by using multi-subframe scheduling signaling belongs to a first resource set, and a PUCCH resource used for an ACK/NACK corresponding to transmission data in a subframe scheduled by using single-subframe scheduling signaling belongs to a second resource set.

It should be noted that, for an implementation manner and an interaction process of the processor, the receiver, and the transmitter in the base station in this embodiment, reference may be made to related descriptions in a corresponding method embodiment.

According to the base station provided in this embodiment of the present invention, user equipment uses different physical uplink channels to report an ACK or an NACK that corresponds to transmission data in a subframe scheduled by using multi-subframe scheduling signaling and transmission data in a subframe scheduled by using single-subframe scheduling signaling, which resolves a problem that a base station cannot determine whether a received ACK or NACK corresponds to transmission data in a subframe scheduled by using multi-subframe scheduling signaling or transmission data in a subframe scheduled by using single-subframe scheduling signaling. Further, the base station can determine whether the UE correctly receives scheduling signaling, which avoids a problem of error spreading in subsequent scheduling.

It should be noted that the apparatus embodiments of the user equipment 20 and the base station 21 in the present invention are combined together and used to implement the method for transmission by using scheduling signaling provided in the method embodiment corresponding to FIG. 13.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application. Therefore, the protection scope of the present invention shall be subject to the protection scope of the claims.

What is claimed is:

1. A method for transmission by using scheduling signaling, the method comprising:
   receiving, by user equipment (UE), scheduling signaling sent by a base station, wherein the scheduling signaling comprises a hybrid automatic repeat request (HARQ) process number field, wherein the HARQ process number field is a field of three bits, and a decimal numerical value corresponding to the field is M, where M is a nonnegative integer;
   acquiring a subframe number of a subframe scheduled by using the scheduling signaling, wherein the subframe number is N, where N is a nonnegative integer;
   determining a transport block according to the HARQ process number field and the subframe number by performing calculation to obtain a first HARQ process according to the first HARQ process number field, wherein the HARQ process is a process whose process number is calculated according to $M*P+\mod(N, P)$, where P is a positive integer value; and
   processing data in the transport block.

2. The method according to claim 1, wherein:
   scheduling signaling is single-subframe scheduling signaling, and the HARQ process number field is a first HARQ process number field; and
   determining a transport block according to the HARQ process number field and the subframe number comprises:
      performing the calculation to obtain the first HARQ process according to the first HARQ process number field in the single-subframe scheduling signaling and the subframe number of the subframe scheduled by using the single-subframe scheduling signaling, and
      determining a first transport block in the first HARQ process according to a preset rule, or transport block configuration signaling in the single-subframe scheduling signaling, wherein the preset rule is a correspondence between a HARQ process and a transport block.

3. The method according to claim 1, wherein:
   the scheduling signaling is single-subframe scheduling signaling, and the HARQ process number field is a first HARQ process number field; and
   determining a transport block according to the HARQ process number field and the subframe number comprises:
      performing the calculation to obtain the first HARQ process according to the first HARQ process number field in the single-subframe scheduling signaling, and
      performing calculation to obtain a first transport block in the first HARQ process according to the subframe number of the subframe scheduled by using the single-subframe scheduling signaling.

4. The method according to claim 1, wherein:
   the scheduling signaling is multi-subframe scheduling signaling, and the HARQ process number field is a second HARQ process number field; and
   determining a transport block according to the HARQ process number field and the subframe number further comprises:
      performing calculation to obtain a second HARQ process according to the second HARQ process number field in the multi-subframe scheduling signaling and the subframe number of the subframe scheduled by using the multi-subframe scheduling signaling, and
      determining a second transport block in the second HARQ process according to a preset rule, or transport block configuration signaling in the multi-subframe scheduling signaling, wherein the preset rule is a correspondence between a HARQ process and a transport block.

5. The method according to claim 1, wherein:
   the scheduling signaling is multi-subframe scheduling signaling, and the HARQ process number field is a second HARQ process number field; and
   determining a transport block according to the HARQ process number field and the subframe number further comprises:
      performing calculation to obtain a second HARQ process according to the second HARQ process number field in the multi-subframe scheduling signaling, and
      performing calculation to obtain a second transport block in the second HARQ process according to the subframe number of the subframe scheduled by using the multi-subframe scheduling signaling.

6. The method according to claim 1, further comprising:
   receiving, by the UE, data according to single-subframe scheduling signaling when the single-subframe scheduling signaling is received in a subframe scheduled by using multi-subframe scheduling signaling.

7. The method according to claim 6, wherein after receiving, by the UE, data according to single-subframe scheduling signaling when the single-subframe scheduling signaling is received in a subframe scheduled by using multi-subframe scheduling signaling, the method further comprises:
   receiving, in a subframe after a last subframe scheduled by using the multi-subframe scheduling signaling, data that is scheduled by using the multi-subframe scheduling signaling and that is in the subframe in which the single-subframe scheduling signaling is received.

8. The method according to claim 7, wherein the multi-subframe scheduling signaling is used to schedule data to be newly transmitted.

9. The method according to claim 6, wherein the single-subframe scheduling signaling is used to schedule data to be retransmitted.

10. The method according to claim 6, wherein the multi-subframe scheduling signaling is used to schedule data to be newly transmitted.

11. User equipment, comprising:
a receiver, configured to receive scheduling signaling sent by a base station, wherein the scheduling signaling comprises a hybrid automatic repeat request (HARQ) process number field, wherein the HARQ process number field is a field of three bits, and a decimal numerical value corresponding to the field is M, where M is a nonnegative integer; and
a processor, configured to:
acquire a subframe number of a subframe scheduled by using the scheduling signaling, wherein the subframe number is N, where N is a nonnegative integer,
determine a transport block according to the HARQ process number field received by the receiver, and the subframe number acquired by the processor, by performing calculation to obtain a first HARQ process according to the first HARQ process number field, wherein the HARQ process is a process whose process number is calculated according to M*P+mod (N, P), where P is a positive integer value, and
process data in the transport block.

12. The user equipment according to claim 11, wherein:
the scheduling signaling is single-subframe scheduling signaling, and the HARQ process number field is a first HARQ process number field; and
the processor is configured to:
perform the calculation to obtain the first HARQ process according to the first HARQ process number field in the single-subframe scheduling signaling and the subframe number of the subframe scheduled by using the single-subframe scheduling signaling, and
determine a first transport block in the first HARQ process according to a preset rule, or transport block configuration signaling in the single-subframe scheduling signaling, wherein the preset rule is a correspondence between a HARQ process and a transport block.

13. The user equipment according to claim 11, wherein:
the scheduling signaling is single-subframe scheduling signaling, and the HARQ process number field is a first HARQ process number field; and
the processor is configured to:
perform the calculation to obtain the first HARQ process according to the first HARQ process number field in the single-subframe scheduling signaling, and
perform calculation to obtain a first transport block in the first HARQ process according to the subframe number of the subframe scheduled by using the single-subframe scheduling signaling.

14. The user equipment according to claim 11, wherein:
the scheduling signaling is multi-subframe scheduling signaling, and the HARQ process number field is a second HARQ process number field; and
the processor is configured to:
perform calculation to obtain a second HARQ process according to the second HARQ process number field in the multi-subframe scheduling signaling and the subframe number of the subframe scheduled by using the multi-subframe scheduling signaling, and
determine a second transport block in the second HARQ process according to a preset rule, or transport block configuration signaling in the multi-subframe scheduling signaling, wherein the preset rule is a correspondence between a HARQ process and a transport block.

15. The user equipment according to claim 11, wherein:
the scheduling signaling is multi-subframe scheduling signaling, and the HARQ process number field is a second HARQ process number field; and
the processor is configured to:
perform calculation to obtain a second HARQ process according to the second HARQ process number field in the multi-subframe scheduling signaling, and
perform calculation to obtain a second transport block in the second HARQ process according to the subframe number of the subframe scheduled by using the multi-subframe scheduling signaling.

16. The user equipment according to claim 11, wherein the receiver is further configured to:
receive data according to single-subframe scheduling signaling when the single-subframe scheduling signaling is received in a subframe scheduled by using multi-subframe scheduling signaling.

17. The user equipment according to claim 11, wherein the receiver is further configured to:
receive, in a subframe after a last subframe scheduled by using the multi-subframe scheduling signaling, data that is scheduled by using the multi-subframe scheduling signaling and that is in the subframe in which the single-subframe scheduling signaling is received.

18. The user equipment according to claim 17, wherein the multi-subframe scheduling signaling is used to schedule data to be newly transmitted.

19. The user equipment according to claim 16, wherein the single-subframe scheduling signaling is used to schedule data to be retransmitted.

20. The user equipment according to claim 16, wherein the multi-subframe scheduling signaling is used to schedule data to be newly transmitted.

* * * * *